(12) United States Patent
Wei et al.

(10) Patent No.: US 12,458,952 B2
(45) Date of Patent: Nov. 4, 2025

(54) M/TiO₂ CATALYSTS AND METHODS OF USE

(71) Applicant: University of Florida Research Foundation, Inc., Gainesville, FL (US)

(72) Inventors: Wei David Wei, Gainesville, FL (US); Jiawei Huang, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 501 days.

(21) Appl. No.: 17/917,163

(22) PCT Filed: Apr. 6, 2021

(86) PCT No.: PCT/US2021/025984
§ 371 (c)(1),
(2) Date: Oct. 5, 2022

(87) PCT Pub. No.: WO2021/207216
PCT Pub. Date: Oct. 14, 2021

(65) Prior Publication Data
US 2023/0158474 A1 May 25, 2023

Related U.S. Application Data

(60) Provisional application No. 63/006,558, filed on Apr. 7, 2020, provisional application No. 63/028,870, filed on May 22, 2020.

(51) Int. Cl.
*B01J 21/06* (2006.01)
*B01J 23/52* (2006.01)
*B01J 35/45* (2024.01)
*B01J 37/08* (2006.01)

(52) U.S. Cl.
CPC .............. *B01J 21/063* (2013.01); *B01J 23/52* (2013.01); *B01J 35/45* (2024.01); *B01J 37/08* (2013.01)

(58) Field of Classification Search
CPC . B01J 21/063; B01J 35/23; B01J 23/52; B01J 37/08; C01P 2002/85; C01P 2004/04
USPC ........ 502/102, 326, 330, 331, 339, 350, 345
See application file for complete search history.

(56) References Cited

U.S. PATENT DOCUMENTS

| | | | |
|---|---|---|---|
| 10,032,928 B2 | 7/2018 | Shimomura et al. | |
| 2008/0008639 A1 | 1/2008 | Sakurai et al. | |
| 2009/0011293 A1 | 1/2009 | Wood et al. | |
| 2011/0152070 A1 | 6/2011 | Fansler et al. | |
| 2013/0281283 A1* | 10/2013 | Hashimoto | B01J 37/06 502/345 |
| 2013/0337995 A1* | 12/2013 | Biener | B01J 21/063 502/344 |
| 2017/0282162 A1* | 10/2017 | Pietron | B01J 35/393 |
| 2023/0160073 A1* | 5/2023 | Wei | C01B 13/0207 205/633 |

FOREIGN PATENT DOCUMENTS

| | | | | |
|---|---|---|---|---|
| CN | 103724174 A | * | 4/2014 | ............ B01J 21/063 |
| CN | 104138757 A | * | 11/2014 | .............. B01J 23/52 |
| CN | 106693956 A | * | 5/2017 | .............. B01J 23/42 |
| CN | 106890638 A | * | 6/2017 | .............. B01J 23/52 |
| CN | 109225219 A | * | 1/2019 | .............. B01J 23/72 |

OTHER PUBLICATIONS

ISR Mailed Jun. 29, 2021; Application No. PCT/US20221/25984, pp. 1-18.
Influence of TiO2 Bulk Defects on CO Adsorption and CO Oxidation on Au/TiO2: Electronic Metal?Support Interactions (EMSIs) in Supported Au Catalysts (Wang et al.) pp. 2339?2345 Publication Date: Feb. 7, 2017 (Feb. 7, 2017) [retrieved on Jun. 1, 2021] 6<DOl:https://doi.org/10.1021/acscatal.7b00251 >.

* cited by examiner

Primary Examiner — Patricia L. Hailey
(74) Attorney, Agent, or Firm — Thomas Horstemeyer LLP.

(57) ABSTRACT

The present disclosure provides for methods for designing and constructing metal/semiconductor heterostructures as catalysts for a wide range of applications such as oxygen activation. In a particular aspect, the present disclosure provides for the manipulation of atomic structures at MJ/TiO₂ interface (e.g., Au/TiO₂ interface) that significantly alters the interfacial electron distribution and prompts O₂ activation. In an aspect, the present disclosure provides for a M/TiO₂ composites (e.g., heterostructures) having a N defect-free M/TiO₂ interface and method of making the M/TiO₂ composites having a defect-free M/TiO₂ interface. The M can be Au, Ag, Cu, Al, Pt, Ni, or Pd, for example.

8 Claims, 9 Drawing Sheets

| Au's | Average charge O$_2$ adsorption |
|---|---|
| Au$_1$ | 0 |
| Au$_2$ | + 0.04 |
| Au$_3$ | + 0.01 |
| Au$_4$ | 0 |
| Au$_5$ | - 0.01 |
| Au$_{10}$ | - 0.01 |
| Au$_{11}$ | - 0.01 |
| Au$_{12}$ | + 0.02 |
| Au$_{13}$ | + 0.01 |
| Au$_{16}$ | + 0.01 |
| Au$_{19}$ (Interface) | + 0.05 |
| Au$_{20}$ | + 0.01 |
| Au$_{21}$ (Interface) | + 0.20 |
| Au$_{22}$ | - 0.01 |
| Au$_{23}$ (Interface) | + 0.05 |
| Au$_{24}$ | + 0.01 |
| Au$_{25}$ (Interface) | + 0.07 |

FIG. 2.9

| Au's | Average charge O$_2$ adsorption |
|---|---|
| Au$_1$ | + 0.01 |
| Au$_3$ | + 0.01 |
| Au$_6$ | + 0.01 |
| Au$_7$ | + 0.01 |
| Au$_8$ | + 0.01 |
| Au$_{10}$ | 0 |
| Au$_{11}$ | 0 |
| Au$_{12}$ | 0 |
| Au$_{13}$ | 0 |
| Au$_{16}$ | 0 |
| Au$_{19}$ (Interface) | + 0.02 |
| Au$_{20}$ | 0 |
| Au$_{21}$ (Interface) | + 0.20 |
| Au$_{22}$ | 0 |
| Au$_{23}$ (Interface) | + 0.10 |
| Au$_{24}$ | - 0.01 |

M/TiO$_2$ CATALYSTS AND METHODS OF USE

CLAIM OF PRIORITY TO RELATED APPLICATION

This application is the 35 U.S.C. § 371 national stage of PCT application having serial number PCT/US2021/025984, filed on Apr. 6, 2021. PCT application (PCT/US2021/025984) claims priority to U.S. provisional application entitled "MANIPULATING ATOMIC STRUCTURES OF AU/TIO2 CATALYSTS FOR EFFICIENT O2 ACTIVATION" having Ser. No. 63/006,558 filed on Apr. 7, 2020. PCT application (PCT/US2021/025984) claims priority to co-pending U.S. provisional application entitled "M/TIO2 CATALYSTS AND METHODS OF USE" having Ser. No. 63/028,870 filed on May 22, 2020, which is entirely incorporated herein by reference.

FEDERAL FUNDING

This invention was made with government support under Grant Nos. 1808539 and DMR-1352328, awarded by the National Science Foundation. The government has certain rights in the invention.

BACKGROUND

The integration of metal nanoparticles (NPs) with oxides can provide for composite material that can be used as catalysts. However, there is a lack of understanding of the exact functionality of atomic structures at metal/oxide interfaces in governing the catalytic activity and its implications for practical applications. Another limitation is the lack of research directed to constructing distinct atomic structures solely at the metal/oxide interface as opposed to adjusting atomic and electronic structures of whole oxides. The lack of understanding and limitations has prevented progress.

SUMMARY

The present disclosure provides for M/TiO$_2$ composites (e.g., heterostructures) having a defect-free M/TiO$_2$ interface and methods of making the M/TiO$_2$ composites having a defect-free M/TiO$_2$ interface.

An aspect of the present disclosure provides for a composition, comprising: a M/TiO$_2$ composite having a defect-free M/TiO$_2$ interface, wherein the M/TiO$_2$ composite has the characteristic of having a higher CO oxidation activity than that on the oxygen vacancy (Vo)-rich M/TiO$_2$ interface. In an aspect, M can be Au, Ag, Cu, Al, Pt, Ni, or Pd. M/TiO$_2$ composite can be a Au/TiO$_2$ composite or Cu/TiO$_2$ composite, for example.

An aspect of the present disclosure provides for a method comprising: providing a M/TiO$_2$ composite having an oxygen vacancy (Vo)-rich M/TiO$_2$ interface; calcinating the M/TiO$_2$ composite at about 300 to 350° C. for a time frame to form a M/TiO$_2$ composite having a defect-free M/TiO$_2$ interface. In an aspect, the time frame is about 1 to 3 hours.

An aspect of the present disclosure provides for a method comprising: heating a mixture of TiO$_2$ with a metal nanoparticle precursor material to form a solid material comprising a M/TiO$_2$ composite having an oxygen vacancy (Vo)-rich M/TiO$_2$ interface; and calcinating the solid material comprising the M/TiO$_2$ composite at about 300 to 350° C. for a time frame to form a M/TiO$_2$ composite having a defect-free M/TiO$_2$ interface. In an aspect, the heating can include heating the mixture at about 300 to 350 K for about 15 to 45 minutes at a pH of about 9-10.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1 illustrates Au/TiO$_2$ heterostructures with distinct interfaces. Schematic of Au/TiO$_2$ heterostructures with (FIG. 1.1A) the defect-free interface and (FIG. 1.1B) the V$_o$-rich interface are shown. The yellow, red, and silver dots represent gold, oxygen, and titanium atoms, respectively. The green dot stands for the interfacial V$_o$. High resolution transmission electron microscopy (HRTEM) images of Au/TiO$_2$ heterostructures with (FIG. 1.1C) the defect-free interface and (FIG. 1.1D) the V$_o$-rich interface.

FIG. 1.2 illustrates electron distributions on Au/TiO$_2$ heterostructures with distinct interfaces. FIG. 1.2A illustrates high-resolution XPS spectra of the Au 4f orbital for Au/TiO$_2$ heterostructures with the defect-free interface (red curve) and Au/TiO$_2$ heterostructures with the V$_o$-rich interface (blue curve). Note: The energy resolution of XPS spectra is 0.1 eV. Different intensities of Au 4f spectra might come from the non-uniform distribution of Au/TiO$_2$ heterostructures on the Si wafer during the XPS sample preparation. FIG. 1.2B illustrates X-band EPR spectra of bare TiO$_2$ NPs (gray curve) and Au/TiO$_2$ heterostructures with the defect-free interface (red curve) at 90 K. FIG. 1.2C illustrates X-band EPR spectra of bare TiO$_2$ NPs (gray curve) and Au/TiO$_2$ heterostructures with the V$_o$-rich interface (blue curve) at 90 K. Note: EPR comparisons between bare TiO$_2$ and two Au/TiO$_2$ heterostructures were carried out using the same amount of samples (ca. 40±2 mg). e$^-$(V$_o$) represents electrons trapped at V$_o$ on TiO$_2$ and Ti$^{3+}$ stands for electrons accumulated at Ti centers of rutile TiO$_2$. The EPR background spectrum has been subtracted from the initial spectra of TiO$_2$ and two Au/TiO$_2$ heterostructures.

FIG. 1.3 illustrates in operando DRIFTS for O$_2$ activation on Au/TiO$_2$ heterostructures with distinct interfaces. FIG. 1.3A illustrates in operando DRIFTS spectra of ν(CO) during O2 activation on Au/TiO$_2$ heterostructures with the defect-free interface. ν$_1$(CO)$_{O_2}$ and ν$_2$(CO)$_{O_2}$ were observed at 2130 cm$^{-1}$ and 2118 cm$^{-1}$, respectively. FIG. 1.3B illustrates schematic of O$_2$ activation on the defect-free Au/TiO$_2$ interface. The electron transfer from Au NPs into perimeter O$_2$ molecules resulted in the less electron density within the interfacial Au—CO region than that of area located away from the interface. FIG. 1.3C illustrates in operando DRIFTS spectra of ν(CO) during O$_2$ activation on Au/TiO$_2$ heterostructures with the V$_o$-rich interface. ν$_1$(CO)$_{O_2}$ and ν$_2$(CO)$_{O_2}$ were observed at 2128 cm$^{-1}$ and 2116 cm$^{-1}$, respectively. FIG. 1.3D illustrates schematic of O$_2$ activation on the V$_o$-rich Au/TiO$_2$ interface. The interfacial V$_o$ trapped electrons and hindered the electron-driven O$_2$ activation, suppressing interfacial CO oxidation. Note: the resolution of DRIFTS spectra is 2 cm$^{-1}$ and CO molecules detected in the headspace have been removed from the spectra. Since DRIFTS spectra were collected during the O$_2$ activation, surface adsorbed CO molecules kept being oxidized by perimeter O$_2$ molecules, resulting in weak CO vibrational signals.

FIG. 2.1 illustrates schematic of preparing Au/TiO$_2$ heterostructures with distinct interfaces via deposition-precipitation (DP) and modified colloidal-deposition (CD) methods. FIG. 2.1A illustrates the DP method. HAuCl$_4$·3H$_2$O was injected into the $TiO_2$ solution, followed by the addition of $NH_4OH$ to form $Au(OH)_3$ species on the $TiO_2$ surface.[13] The calcination (210° C. for 3 h) removed surface OH groups and facilitated the diffusion of Au atoms into surface $V_o$, resulting in $Au/TiO_2$ heterostructures with the defect-free interface. FIG. 2.1B illustrates the CD method. Au NPs at ca. 4-5 nm were first synthesized and then directly mixed with the $TiO_2$ solution. The diffusion of Au atoms was constrained by the preexisting Au—Au bonding on NPs, leaving $V_o$ at the heterogeneous interface.

FIG. 2.2 illustrates high-resolution XPS spectra for $Au/TiO_2$ and $Au/SiO_2$ heterostructures. FIG. 2.2A illustrates high-resolution XPS spectrum of the C 1s orbital for $Au/TiO_2$ heterostructures with the $V_o$-rich interface. FIG. 2.2B illustrates high-resolution XPS spectrum of the Au 4f orbital for $Au/SiO_2$ heterostructures. The binding energy of Au $4f_{72}$ orbital for $Au/SiO_2$ heterostructures was 84.0±0.1 eV, indicating the neutral Au on $SiO_2$.

FIG. 2.3 illustrates simulated X-band EPR spectra. FIG. 2.3A illustrates experimental (black) and simulated (gray) X-band EPR spectra of $TiO_2$. FIG. 2.3B illustrates experimental (red) and simulated (gray) X-band EPR spectra of $Au/TiO_2$ heterostructures with the defect-free interface. FIG. 2.3C illustrates experimental (blue) and simulated (gray) X-band EPR spectra of $Au/TiO_2$ heterostructures with the $V_o$-rich interface. The simulated spectra (gray) are further deconvoluted into various respective components, where $e^-(V_o)$ (pink) represents electrons trapped at $V_o$, rutile $Ti^{3+}$ (orange) is assigned to electrons trapped at $Ti^{3+}$ sites in the rutile phase.[13,15,16] Note: EPR spectra were collected at 90 K in the dark and the EPR background spectrum was subtracted from the initial spectra.

FIG. 2.4 illustrates schematic of the electron distribution on $Au/TiO_2$ heterostructures with distinct interfaces. FIG. 2.4A illustrates $Au/TiO_2$ heterostructures with the defect-free interface, showing the electron transfer pathway from $Ti^{3+}$ species of $TiO_2$ into Au NPs. FIG. 2.4B illustrates $Au/TiO_2$ heterostructures with the $V_o$-rich interface, showing that interfacial $V_o$ trap electrons from $Ti^{3+}$ species, decreasing the number of electrons into Au NPs. CB and VB represent the conduction band minimum and valence band maximum of $TiO_2$ NPs, respectively.

FIG. 2.5 illustrates X-band EPR spectra of $Au/TiO_2$ heterostructures with the defect-free interface prepared by using different amounts of Au. Note: $Ti^{3+}$ stands for electrons accumulated at Ti centers of the rutile $TiO_2$. EPR spectra were collected at 90 K in the dark and the EPR background spectrum was subtracted from the initial spectra.

FIG. 2.6 illustrates X-band EPR spectra of $Au/TiO_2$ heterostructures with the $V_o$-rich interface prepared by using different amounts of Au NPs. FIG. 2.6A illustrates $TiO_2$. No EPR feature from $e^-(V_o)$ was observed. FIG. 2.6B illustrates $Au/TiO_2$ heterostructures with 0.5 wt % loading amount of Au NPs. The intensity ratio of $e^-(V_o)/Ti^{3+}$ was found to be smaller than 1. FIG. 2.6C illustrates $Au/TiO_2$ heterostructures with 1.0 wt % loading amount of Au NPs. The intensity ratio of $e^-(V_o)/Ti^{3+}$ was observed to be larger than 1. The variation in the intensity ratio of $e^-(V_o)/Ti^{3+}$ between 0.5 wt % and 1.0 wt % Au loading amount revealed that increasing the loading amount of Au NPs gave a rise in the EPR feature of $e^-(V_o)$, confirming that $V_o$ should be located at the heterogeneous interface. Note: $e^-(V_o)$ represents electrons trapped at $V_o$ and $Ti^{3+}$ stands for electrons accumulated at Ti centers of rutile $TiO_2$. EPR spectra were collected at 90 K in the dark and the EPR background spectrum was subtracted from the initial spectra.

FIG. 2.7 illustrates vibrational mode of carbon monoxide molecules v(CO) on $Au/TiO_2$ heterostructures in the absence of perimeter $O_2$ molecules (before $O_2$ activation). FIG. 2.7A illustrates v(CO) for $Au/TiO_2$ heterostructures with the defect-free interface under 1% CO/He condition, where v(CO) was observed at 2103 $cm^{-1}$. FIG. 2.7B illustrates schematic of CO molecules adsorbed on $Au/TiO_2$ heterostructures with the defect-free interface. Electrons transferred from $TiO_2$ into Au uniformly distributed on the Au surface, increasing the electron density within the Au—CO region. FIG. 2.7C illustrates v(CO) for $Au/TiO_2$ heterostructures with the $V_o$-rich interface under 1% CO/He condition, where v(CO) was found at 2107 $cm^{-1}$. FIG. 2.7D illustrates schematic of CO molecules adsorbed on $Au/TiO_2$ heterostructures with the $V_o$-rich interface. Interfacial $V_o$ suppressed electrons from transferring into Au, reducing the electron density within the Au—CO region. Note: the resolution of DRIFTS spectra is 2 $cm^{-1}$ and CO molecules detected in the headspace were subtracted from the DRIFTS spectra.

FIG. 2.8 illustrates DFT study of the charge variation in Au atoms after the adsorption of $O_2$ molecules at the perimeter of $Au/TiO_2$ heterostructures with the defect-free interface. The charge variation in Au atoms (Δ charge after $O_2$ adsorption) was obtained from the subtraction of charge of Au atoms before $O_2$ adsorption from that of Au atoms after the $O_2$ adsorption at the perimeter. The interfacial Au atoms (i.e., $Au_{19}$, $Au_{21}$, $Au_{23}$, and $Au_{121}$) near perimeter O2 molecules became more positively charged than Au atoms away from the interface. Meanwhile, the charge of $O_2$ molecules changed from 0 (before adsorption) to −0.55 and −0.38 after the adsorption at the perimeter.

FIG. 2.9 illustrates DFT study of the charge variation in Au atoms after the adsorption of $O_2$ molecules at the perimeter of $Au/TiO_2$ heterostructures with the $V_o$-rich interface. The charge variation in Au atoms (Δ charge after $O_2$ adsorption) was obtained from the subtraction of charge of Au atoms before $O_2$ adsorption from that of Au atoms after the $O_2$ adsorption at the perimeter. Interfacial Au atoms (i.e., $Au_{19}$, $Au_{21}$ and $Au_{23}$) near perimeter $O_2$ molecules became more positively charged than Au atoms away from the interface. However, the sum of charge variations for interfacial Au atoms on the $V_o$-rich interface (i.e., +0.32) was smaller than that on the defect-free interface (i.e., +0.37), demonstrating that fewer electrons transferred from Au NPs into perimeter $O_2$ molecules at the $V_o$-rich interface.

FIG. 2.10 illustrates CO oxidation on $Au/TiO_2$ heterostructures with distinct interfaces. FIG. 2.10A illustrates the activation barrier of CO oxidation on $Au/TiO_2$ heterostructures with distinct interfaces. The activation barrier of CO oxidation on $Au/TiO_2$ heterostructures with the $V_o$-rich interface was measured to be 34.6±2.7 kJ/mol, while the activation barrier of CO oxidation on $Au/TiO_2$ heterostructures with the defect-free interface was 12.6±1.9 kJ/mol. FIG. 2.10B illustrates the conversion of CO to $CO_2$ on $Au/TiO_2$ heterostructures with the $V_o$-rich interface and the defect-free interface at room temperature. The activity of CO oxidation on $Au/TiO_2$ heterostructures with the defect-free interface exhibited a ca. 34 times higher CO oxidation activity than that on $Au/TiO_2$ heterostructures with the $V_o$-rich interface.

FIG. 2.11 illustrates X-band EPR spectra of $Au/TiO_2$ heterostructures with the $V_o$-rich interface after the calcination under 320° C. FIG. 2.11A illustrates EPR spectrum of $Au/TiO_2$ heterostructures with the $V_o$-rich interface before the 320° C. calcination. FIG. 2.11B illustrates EPR spectrum of $Au/TiO_2$ heterostructures with the $V_o$-rich interface after the 320° C. calcination. A decrease in the ratio of $e^-(V_o)/Ti^{3+}$ was observed after the 320° C. calcination, revealing that this high temperature calcination removed interfacial $V_o$ and released electrons. Note: $e^-(V_o)$ represents electrons trapped at $V_o$ and $Ti^{3+}$ stands for electrons accumulated at Ti centers of rutile $TiO_2$. EPR spectra were collected at 90 K in the dark and the EPR background spectrum was subtracted from the initial spectra.

FIG. 2.12 illustrates CO oxidation on $Au/TiO_2$ heterostructures with the $V_o$-rich interface. The activity of CO oxidation after the calcination at 320° C. was 18.5 times higher than that on as-prepared $Au/TiO_2$ heterostructures with the $V_o$-rich interface.

FIG. 2.13 illustrates TEM images of two $Au/TiO_2$ heterostructures. FIG. 2.13A illustrates $Au/TiO_2$ heterostructures with the defect-free interface. The average size of Au NPs was 4.3±0.7 nm. FIG. 2.13B illustrates $Au/TiO_2$ heterostructures with the $V_o$-rich interface. The average size of Au NPs was 5.0±0.9 nm. The similar size distribution of Au NPs on two $Au/TiO_2$ heterostructures excluded the size effect from influencing the activity of CO oxidation.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, mechanical engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary.

It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Discussion

In accordance with the purpose(s) of the present disclosure, embodiments of the present disclosure provide for a $M/TiO_2$ composite (e.g., $M/TiO_2$ heterostructures) having a defect-free $M/TiO_2$ interface and method of making the $M/TiO_2$ composite having a defect-free $M/TiO_2$ interface.

The present disclosure provides for methods for designing and constructing metal/semiconductor heterostructures as catalysts for a wide range of applications such as oxygen activation. In a particular aspect, the present disclosure provides for the manipulation of atomic structures at $M/TiO_2$ interface (e.g., $Au/TiO_2$ interface) that significantly alters the interfacial electron distribution and prompts $O_2$ activation. As described in more detail in Example 1, at the defect-free $Au/TiO_2$ interface, electrons transfer from $Ti^{3+}$ species into Au nanoparticles (NPs) and further migrate into adsorbed perimeter $O_2$ molecules (i.e., in the form of Au—O—O—Ti), facilitating $O_2$ activation and leading to a higher CO oxidation activity than that on the oxygen vacancy ($V_o$)-rich $Au/TiO_2$ interface, at which electrons from $Ti^{3+}$ species are trapped by interfacial $V_o$ on $TiO_2$ and hardly interact with perimeter $O_2$ molecules. Other metals can be used in place of Au, such as Ag and Cu as well as other metals with similar properties as they relate to this disclosure.

The $M/TiO_2$ composite has shown the capability of driving water-gas shift reactions, CO oxidation, and photocatalytic water oxidation reactions. For instance, the $Ni/TiO_2$ composite enabled the efficient transformation of CO and $H_2O$ into $CO_2$ and $H_2$ in the water-gas shift reaction, during which the interfacial $Ni^{\delta-}$-oxygen vacancy-$Ti^{3+}$ structure functioned as reaction sites to dissociate $H_2O$ into $H_2$ and O adatom (J. Am. Chem. Soc. 2018, 140, 11241-11251). The O adatom further occupied the interfacial oxygen vacancy, followed by oxidizing adsorbed interfacial CO to produce $CO_2$. Additionally, the $Au/TiO_2$ composite has been widely utilized as catalysts in CO oxidation. The construction of $Au/TiO_2$ interface significantly promoted the adsorption of $O_2$ molecules (i.e., in the form of Au—O—O—Ti), facilitating the $O_2$ activation and leading to the CO oxidation (J. Am. Chem. Soc. 2012, 134, 12717-12723). The $Au/TiO_2$ composite also exhibited the photocatalytic activity of oxidizing water to produce $O_2$ molecules. Under visible-light irradiation, surface plasmon resonance was induced on Au NPs, resulting in the generation of energetic carriers (hot electrons and hot holes) (J. Am. Chem. Soc. 2017, 139, 11771-11778). These plasmon-generated hot holes ($h^+$) in Au NPs were accumulated at the Au/TiO$_2$ interface under the steady-state condition and were able to oxidize water to produce 02 ($H_2O+h^+ \rightarrow O_2+4H^+$).

The present disclosure provides for a composition that includes a M/TiO$_2$ composite having a defect-free M/TiO$_2$ interface. M can be Au, Ag, Al, Cu, Pt, Ni, or Pd. The M/TiO$_2$ composite has a characteristic of having a higher CO oxidation activity than that on the oxygen vacancy ($V_o$)-rich M/TiO$_2$ interface. In particular, the M/TiO$_2$ composite has a characteristic of having a higher (e.g., at least 10 times, at least 15 times, at least 20 times, at least 25 times, at least 30 times, or at least 34 times) CO oxidation activity than that on the oxygen vacancy ($V_o$)-rich Au/TiO$_2$ interface. When the M/TiO$_2$ composite is a Au/TiO$_2$ composite, the Au/TiO$_2$ composite has a characteristic of having a higher (e.g., at least 10 times, at least 15 times, at least 20 times, at least 25 times, at least 30 times, or at least 34 times) CO oxidation activity than that on the oxygen vacancy ($V_o$)-rich Au/TiO$_2$ interface. The M/TiO$_2$ composite can have a longest dimension (e.g., diameter, length, width, etc.) of about 10 to 50 nm, about 10 to 35 nm, about 10 to 30 nm, about 15 to 30 nm, about 15 to 35 nm, about 20 to 35 nm, about 25 to 35 nm, about 20 to 30 nm, about 20 to 28 nm, or about 23 to 27 nm, where the longest dimension will depend upon at least the M and TiO$_2$ selected.

While the method of making is provided here, additional details are provided in Example. The method of making the composition that includes the M/TiO$_2$ composite having the defect-free M/TiO$_2$ interface can include heating a mixture of TiO$_2$ (e.g., Degussa P25) with a metal nanoparticle precursor material (e.g., HAuCl$_4$ for Au). The mixture can be heated at about 300 to 350 K or about 323 K for a time frame of about 15 to 45 minutes or about 30 minutes. The mixture, a solution, can then have it's pH modified to 9 to 10 using a base (e.g., ammonium hydroxide). The mixture can be further heated at about 300 to 350 K or about 323 K for a time frame of about 3 to 5 hours or about 4 hours to form a solid material comprising a M/TiO$_2$ composite having an oxygen vacancy ($V_o$)-rich M/TiO$_2$ interface. The solid is separated, washed, and dried prior to calcinating the M/TiO$_2$ composite (a powder at this stage) at about 300 to 350° C. for a time frame to form a M/TiO$_2$ composite having a defect-free M/TiO$_2$ interface. The powder can be formed into a layer, into larger particles (e.g., nanometer to micrometer scales), disposed (e.g., chemically or mechanical attached) on a substrate, or the like and used as desired.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

The integration of metal nanoparticles (NPs) with oxides offers unique opportunities for driving catalytic reactions as compared to their catalytically inaccessible single-component counterparts.[1-16] However, an understanding of the exact functionality of atomic structures at metal/oxide interfaces in governing the catalytic activity and its implications for practical applications has not yet been established.[17,18] For instance, interfacial atomic structures of Au/TiO$_2$ heterostructures are complicated when Au is nucleated at surface defects with various coordinated structures of different facets, surface structures, and grain boundaries of TiO$_2$ NPs.[19-20] Another major limitation is the lack of strategies for constructing distinct atomic structures solely at the metal/oxide interface rather than adjusting atomic and electronic structures of whole oxides,[22,23] making it challenging to correlate the interfacial-structure-dependent electron distribution with the catalytic activity.

In this example, we reported how interfacial atomic structures of metal/oxide were manipulated to alter the electron distribution and promote $O_2$ activation for CO oxidation. Using different fabrication strategies, we successfully fabricated two Au/TiO$_2$ heterostructures with distinct interfaces and revealed that for the defect-free Au/TiO$_2$ interface, electrons originated from $Ti^{3+}$ species were transferred from TiO$_2$ into Au NPs, while those electrons were trapped at $V_o$ on TiO$_2$ at the $V_o$-rich interface. Further investigations showed that such divergent electron distributions on Au/TiO$_2$ heterostructures resulted in significantly different efficiencies for electron-driven $O_2$ activation. For Au/TiO$_2$ with the defect-free interface, electrons that transferred from $Ti^{3+}$ species into Au NPs further migrated to $O_2$ molecules adsorbed on the perimeter (i.e., in the form of Au—O—O—Ti) to promote $O_2$ activation. This led to a ca. 34 times higher CO oxidation than that on Au/TiO$_2$ with the $V_o$-rich interface, where electrons were mainly trapped at interfacial $V_o$ on TiO$_2$ and inhibited from interacting with perimeter $O_2$ molecules. Moreover, we discovered that calcination at 320° C. significantly decreased the amount of $V_o$ at the $V_o$-rich Au/TiO$_2$ interface, releasing electrons initially trapped at the interfacial $V_o$ on TiO$_2$ for improving the efficiency of $O_2$ activation.

Figure 11:
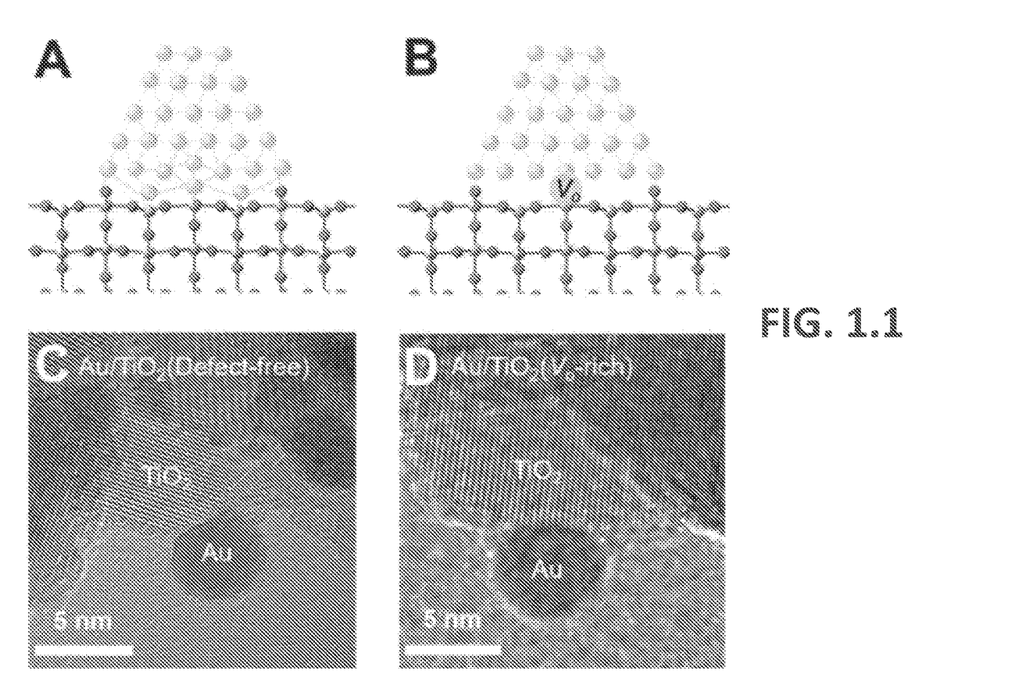
Figure 21:
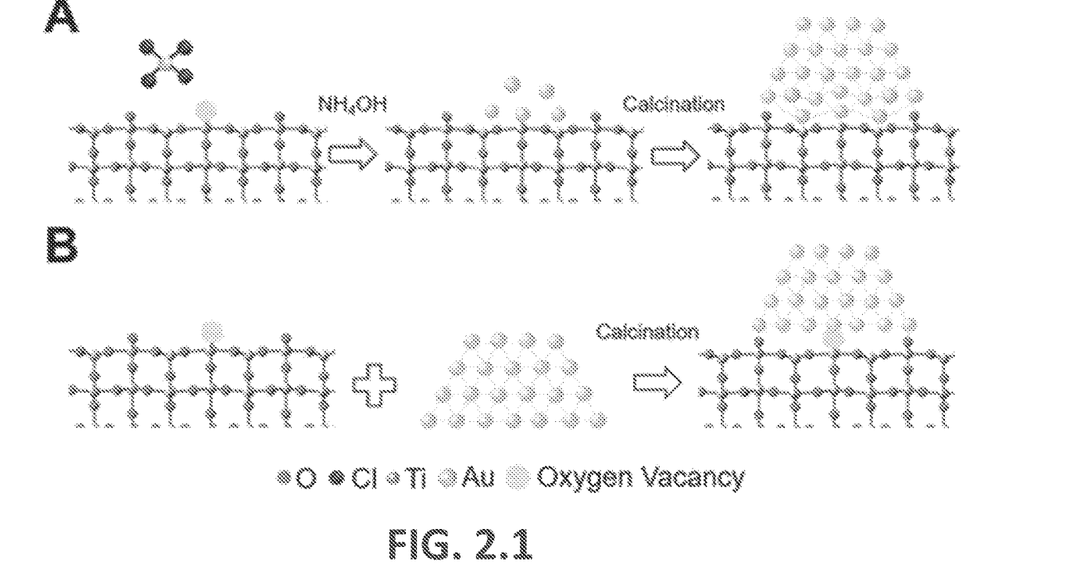
Figure 22:
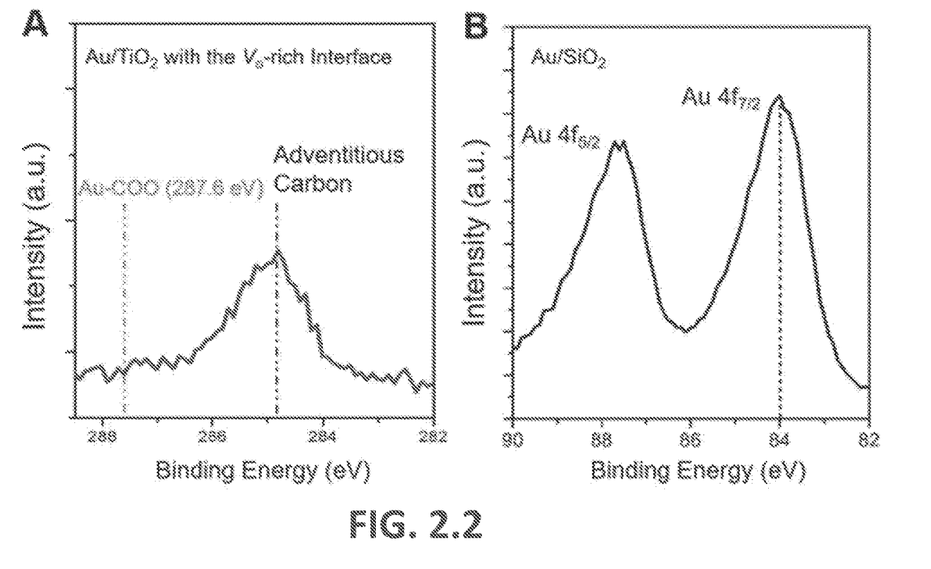
Figure 23:
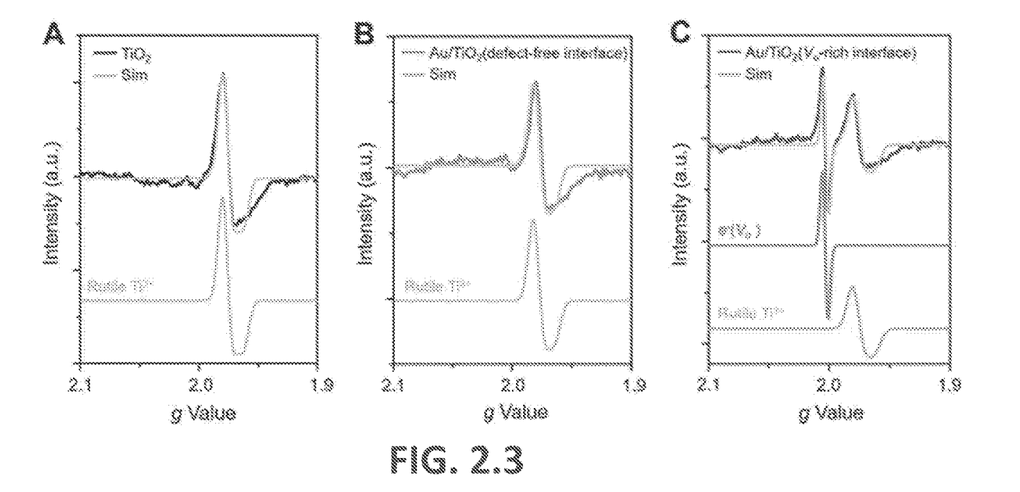
Figure 24:
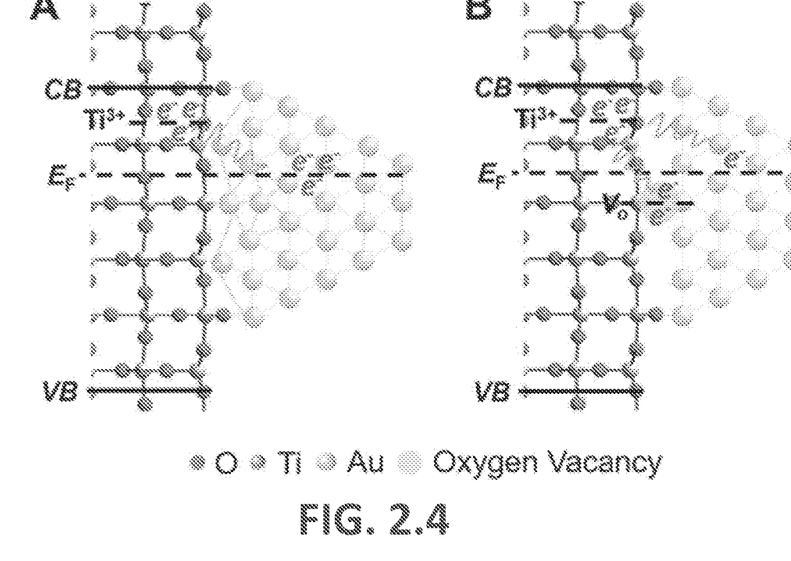
Figure 25:
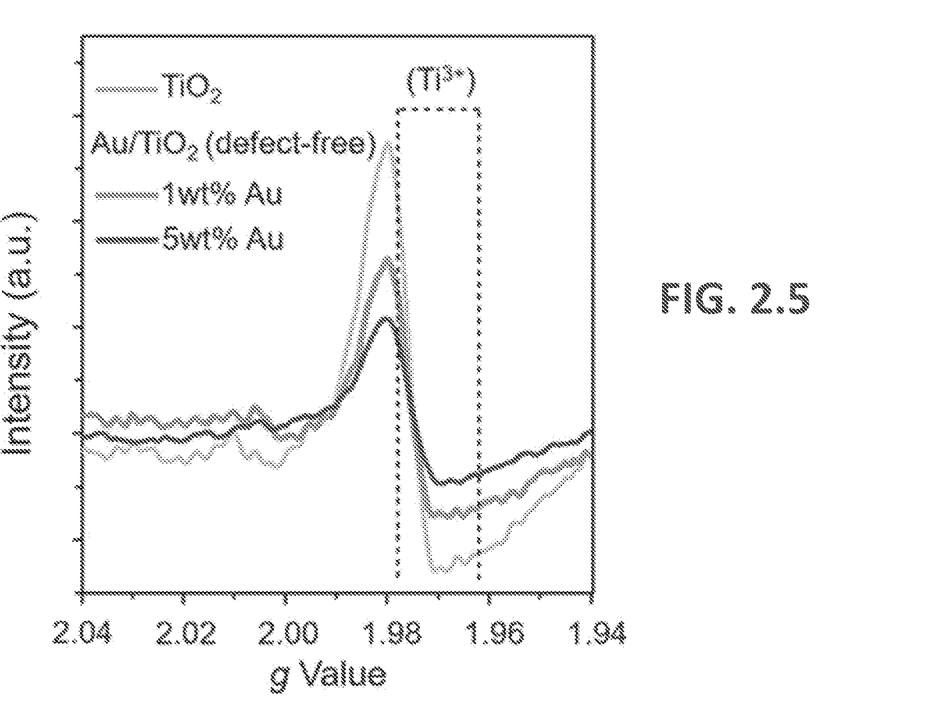
Figure 26:
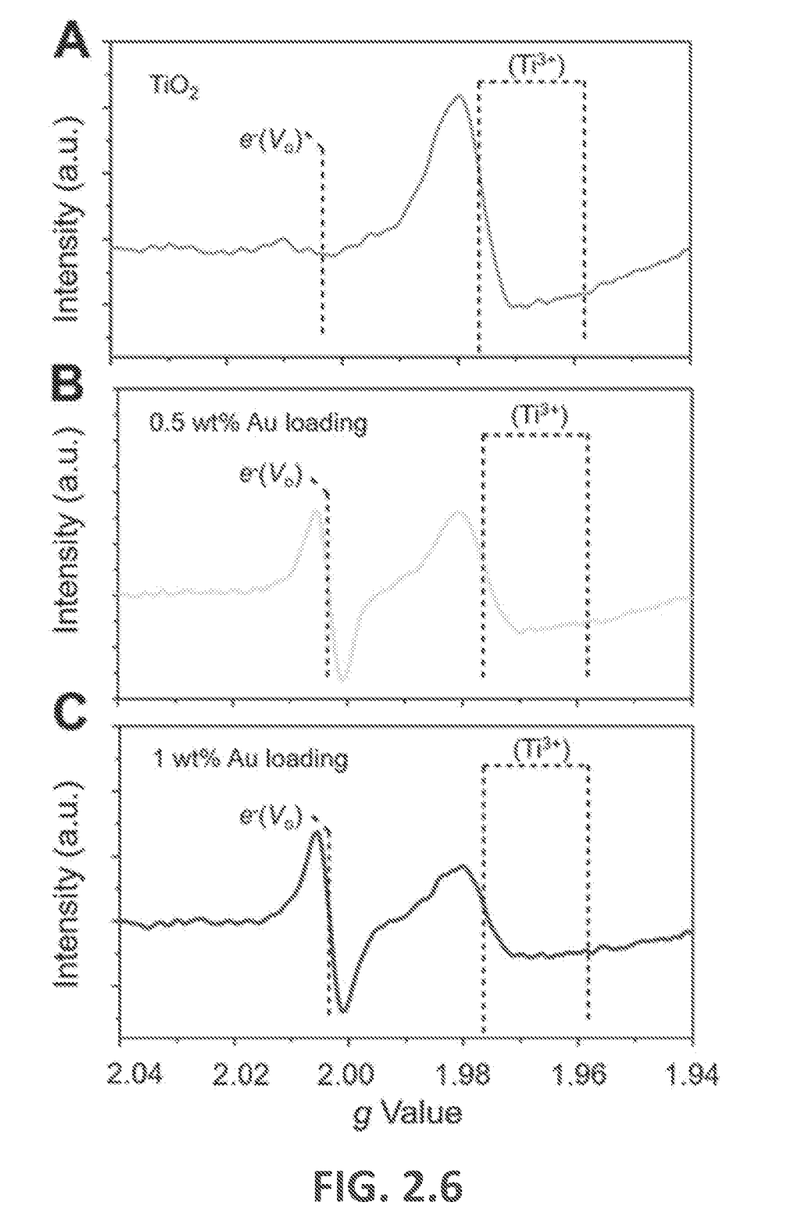

Two Au/TiO$_2$ heterostructures, with defect-free interface and $V_o$-rich interface, were prepared (FIGS. 1.1A and 1.1B). Using the deposition-precipitation (DP) method,[24] chloroauric acid trihydrate (HAuCl$_4$-3H$_2$O) was directly reduced on the surface of TiO$_2$ NPs. The diffusion of Au atoms into surface $V_o$ on TiO$_2$ mediated the formation of chemical bonds with Ti atoms[22] and developed a defect-free interface (FIG. 2.1A). Meanwhile, through a modified colloidal-deposition (CD) method,[25] pre-synthesized Au NPs were directly deposited onto TiO$_2$ NPs, maintaining $V_o$ at the Au/TiO$_2$ interface (FIG. 2.1B). X-ray photoelectron spectroscopy (XPS) proved that no observable citrate ions remained on Au NPs in Au/TiO$_2$ heterostructures with the $V_o$-rich interface (FIG. 2.2A). It is noted that with the exception of different atomic structures, both defect-free and $V_o$-rich Au/TiO$_2$ interfaces contained well-defined nanoscale physical contacts to ensure the interfacial electron transfer (FIGS. 1.1C and 1.1D).[24,26,27]

Figure 12:
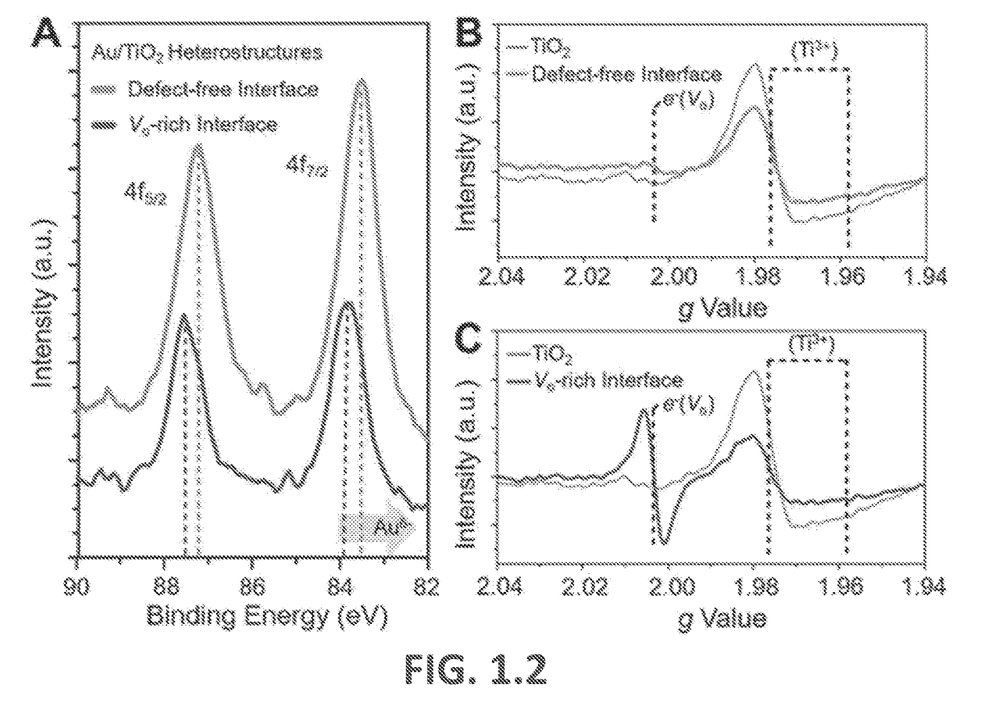

When compared to Au/SiO$_2$ heterostructures (i.e., 84.0±0.1 eV in FIG. 2.2B), high-resolution XPS showed that the Au 4f$_{7/2}$ of both Au/TiO$_2$ heterostructures shifted to the lower binding energies (FIG. 1.2A: 83.6±0.1 eV for the defect-free interface and 83.8±0.1 eV for the $V_o$-rich interface). This indicated that electrons transferred from TiO$_2$ into Au NPs via the heterogeneous interface. Moreover, the more lower binding energy of Au 4f$_{7/2}$ (i.e., 83.6±0.1 eV)

strongly suggested that more electrons were transferred from $TiO_2$ to Au for $Au/TiO_2$ heterostructures with the defect-free interface.

Distinct electron distributions between those two $Au/TiO_2$ heterostructures were further verified using X-band electron paramagnetic resonance (EPR) spectroscopy. Compared to bare $TiO_2$ NPs, the EPR feature of electrons accumulated at Ti centers (i.e., $Ti^{3+}$ species)[28-30] significantly decreased on $Au/TiO_2$ heterostructures with the defect-free interface (FIG. 1.2B and FIGS. 2.3A and 2.3B), suggesting that electrons transferred from $Ti^{3+}$ species of $TiO_2$ into Au NPs (i.e., EPR silent) (FIG. 2.4A). Additionally, no $V_o$-related EPR feature was observed at the defect-free $Au/TiO_2$ interface even with 5 wt. % Au (FIG. 2.5), demonstrating that the addition of Au NPs on $TiO_2$ did not affect the distribution of $V_o$ in $TiO_2$ to influence the electron distribution at the defect-free $Au/TiO_2$ interface. For $Au/TiO_2$ heterostructures with the $V_o$-rich interface, despite the observation of a similar decrease of $Ti^{3+}$ species, a new EPR feature (g=2.003) appeared and was assigned to electrons trapped at $V_o$ of $TiO_2$ (FIG. 1.2C, blue curve and FIG. 2.3C).[28-30] Interestingly, the intensity of this EPR feature continued to rise when the Au NP loading was increased (FIG. 2.6), confirming that those $V_o$ must place exactly at the $Au/TiO_2$ interface. Thus, electrons originally from $Ti^{3+}$ species would be trapped at the interfacial $V_o$ of $TiO_2$ rather than transferring into Au NPs (FIG. 2.4B).

The electron distribution at $Au/TiO_2$ interface has been reported to determine the activation of perimeter $O_2$ molecules, in which negatively charged Au NPs induced by the interfacial electron transfer from $TiO_2$ to Au exhibit a higher $O_2$ activation efficiency than that on neutral Au NPs.[5,31,32] Meanwhile, it is known that the vibrational mode of adsorbed carbon monoxide molecules v(CO) is sensitive to the change of electron density of Au NPs,[33,34] making CO an ideal molecular probe to spectroscopically study the electron-distribution-dependent O2 activation on those two $Au/TiO_2$ heterostructures in operando.

Figure 13:
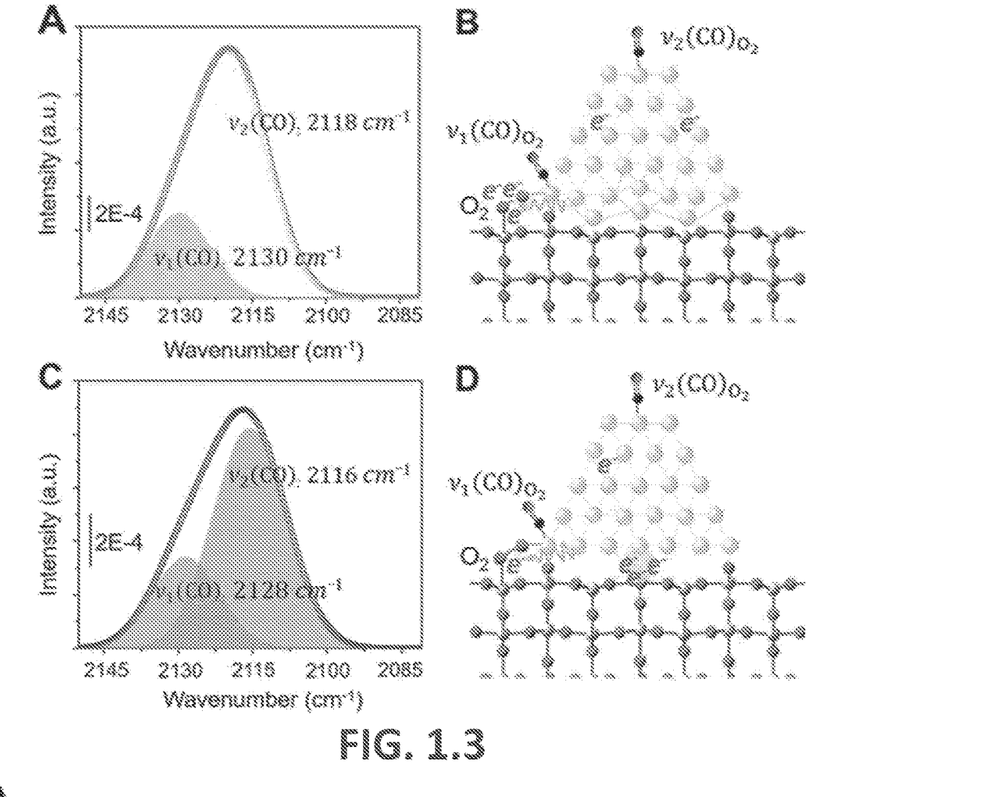
Figure 27:
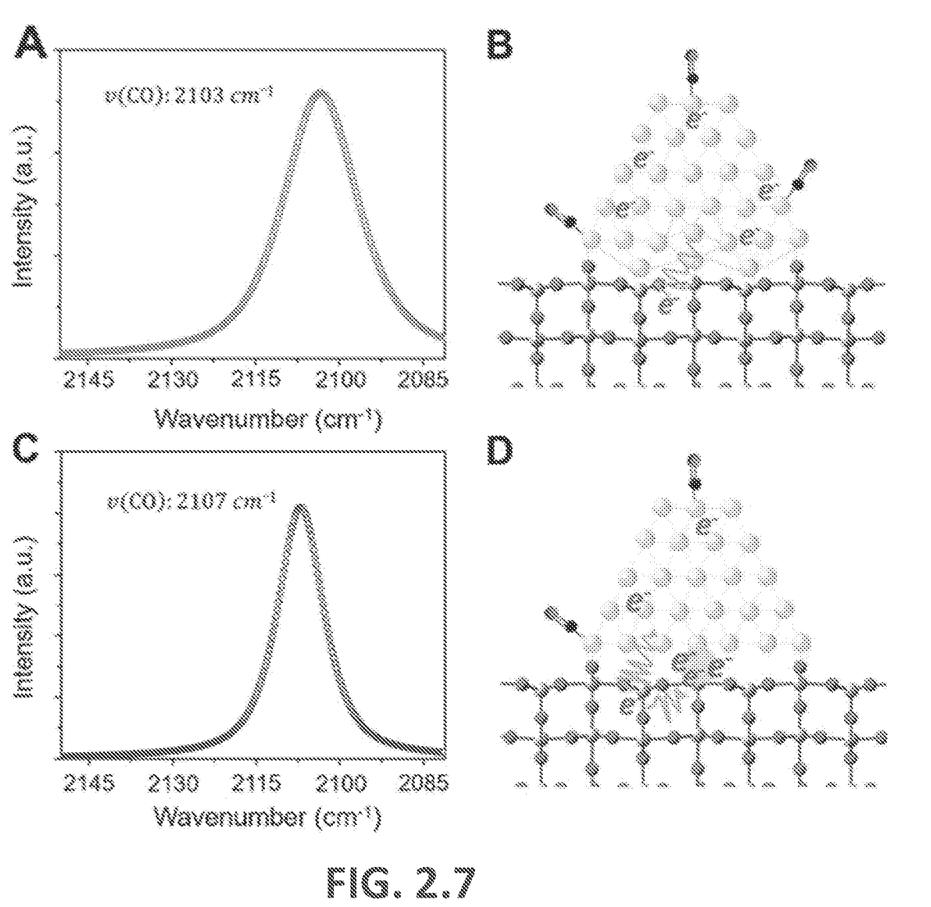
Figure 28:
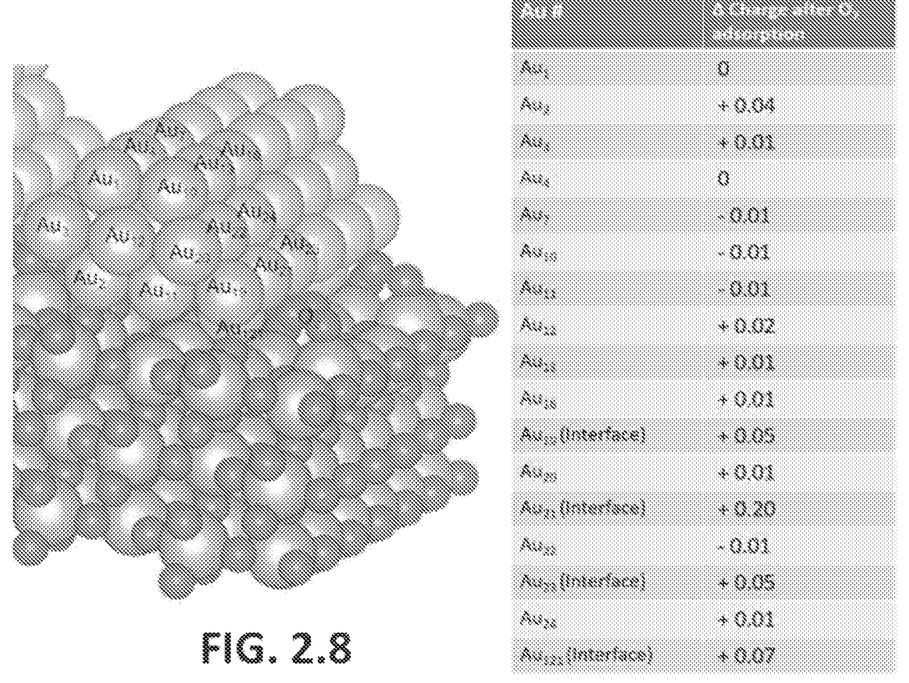
Figure 29:
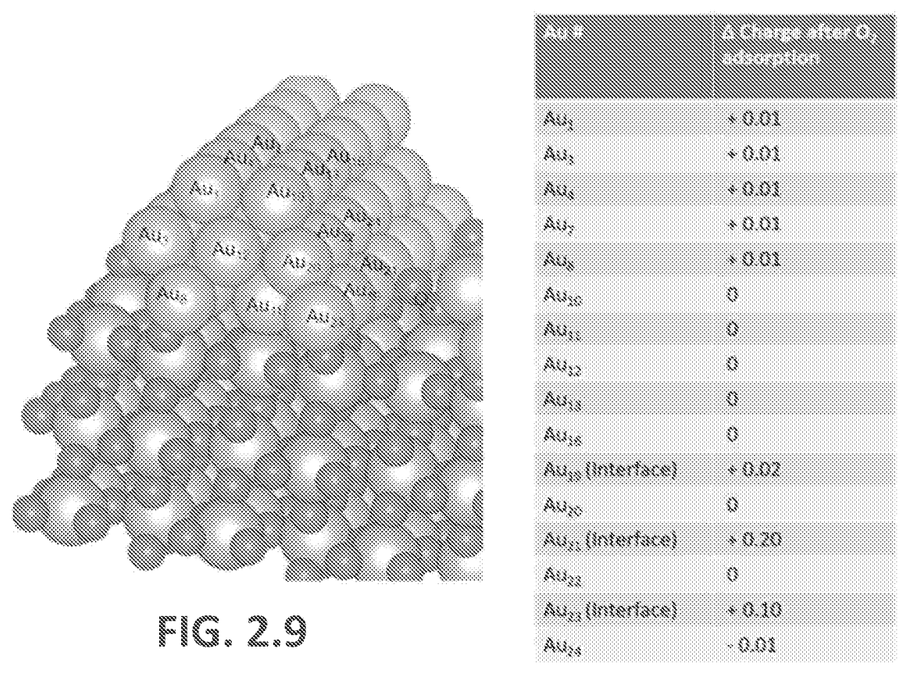

For $Au/TiO_2$ heterostructures with the defect-free interface, two vibrational signatures were observed during $O_2$ activation (FIG. 1.3A) that were distinct from the mode observed for adsorbed CO before $O_2$ activation (i.e., 2103±2 $cm^{-1}$ in FIGS. 2.7A and 2.7B). Interestingly, both CO vibrational modes blue-shifted ($v_1(CO)_{O_2}$=2130±2 $cm^{-1}$ and $v_2(CO)_{O_2}$=2118±2 $cm^{-1}$), suggesting a decrease of electron density on Au NPs during $O_2$ activation as the reduced electron density on Au weakened the Au—CO π-backbonding.[33,35] Furthermore, density functional theory (DFT) calculations found that during $O_2$ activation, interfacial Au atoms near perimeter $O_2$ molecules were more electron-deficient than those away from the interface (FIG. 2.8). Accordingly, we assigned $v_1(CO)_{O_2}$ to CO molecules adsorbed at the $Au/TiO_2$ perimeter and $v_2(CO)_{O_2}$ to CO molecules adsorbed on Au atoms away from the interface (FIG. 1.3B). DFT calculations confirmed that once the electron density on Au NPs decreased, perimeter $O_2$ molecules became negatively charged (FIG. 2.8), suggesting that electrons were transferred from Au NPs into perimeter $O_2$ molecules for $O_2$ activation (FIG. 1.3B).

Vibrational modes of adsorbed CO molecules on $Au/TiO_2$ heterostructures with the $V_o$-rich interface ($v_1(CO)_{O_2}$=2128±2 $cm^{-1}$ and $v_2(CO)_{O_2}$=2116±2 $cm^{-1}$ in FIG. 1.3C) were also found to blue-shift during $O_2$ activation compared to signals observed before $O_2$ activation (i.e., 2107±2 $cm^{-1}$ in FIGS. 2.7C and 2.7D). However, blue-shifts of both vibrational modes were less than those on $Au/TiO_2$ heterostructures with the defect-free interface, suggesting that fewer electrons were transferred from Au NPs into perimeter $O_2$ molecules on the $V_o$-rich $Au/TiO_2$ interface. Further DFT calculations showed less of a decrease of electron density on the Au surface (FIG. 2.9). This observation is consistent with that demonstrated in our XPS and EPR measurements of $Au/TiO_2$ heterostructures with the $V_o$-rich interface (FIGS. 1.2A and C): electrons were trapped at the interfacial $V_o$ and, consequently, were hardly transferred into perimeter $O_2$ molecules (FIG. 1.3D).

Figure 210:
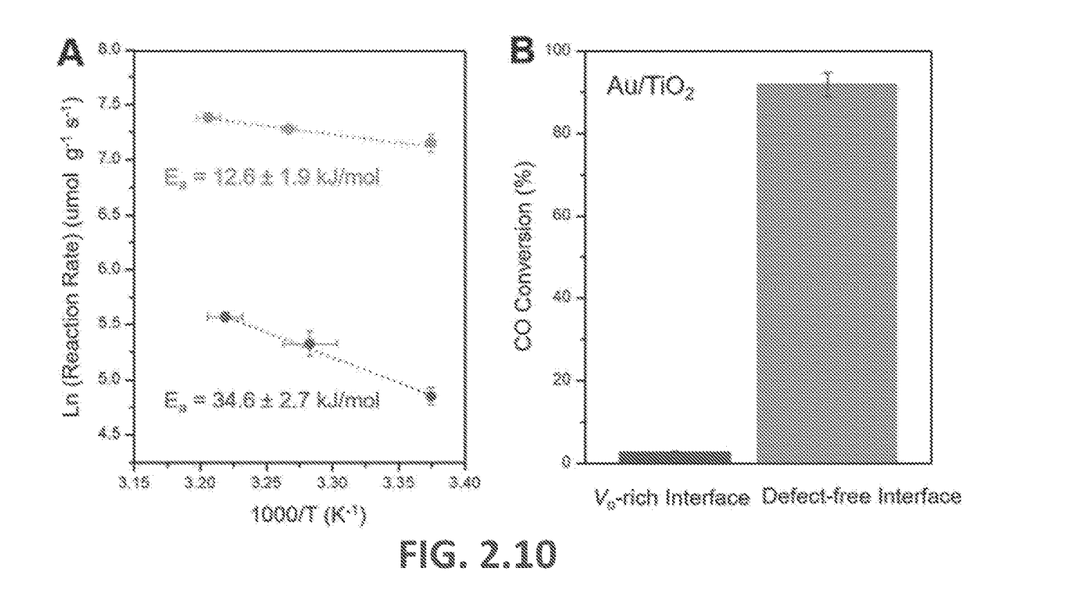

Different amounts of interfacial electrons transferred into perimeter $O_2$ molecules on these two $Au/TiO_2$ heterostructures led to discrete efficiencies for $O_2$ activation, which is the rate-determining step in CO oxidation.[6,36,37] As shown in FIG. 2.10A, the activation barrier of CO oxidation on $Au/TiO_2$ heterostructures with the defect-free interface (12.6±1.9 kJ/mol) was much smaller than that on $Au/TiO_2$ heterostructures with the $V_o$-rich interface (34.6±2.7 kJ/mol). This result confirmed that more electrons migrated from Au into perimeter $O_2$ molecules on the defect-free interface and significantly facilitated $O_2$ activation, eventually leading to a ca. 34 times higher activity of CO oxidation than that on $Au/TiO_2$ heterostructures with the $V_o$-rich interface (FIG. 2.10B).

Figure 211:
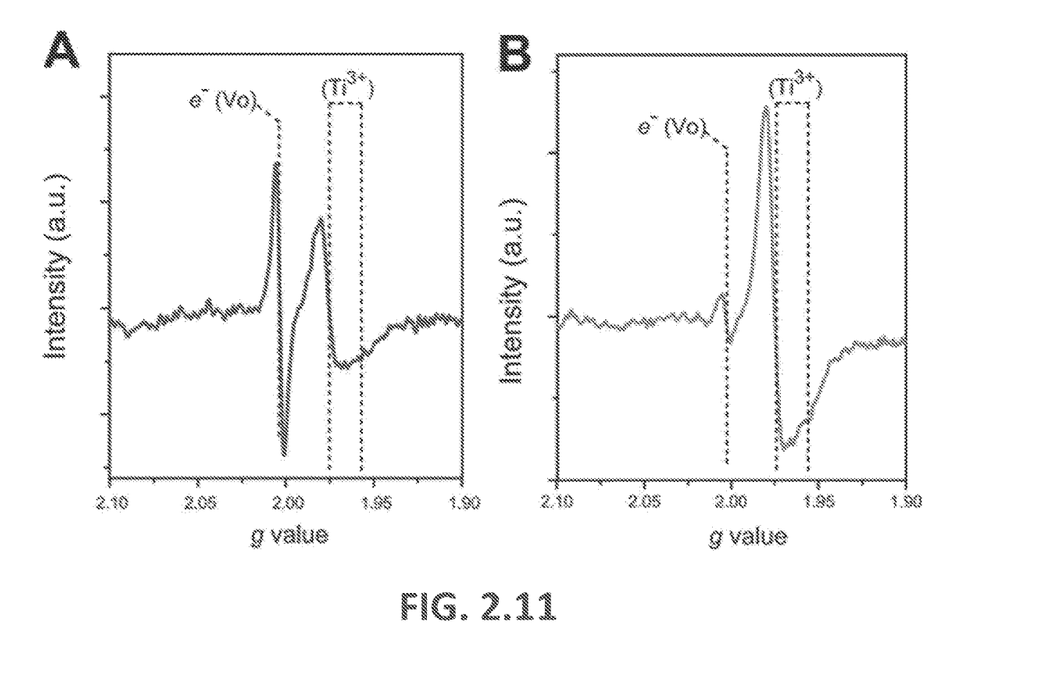
Figure 212:
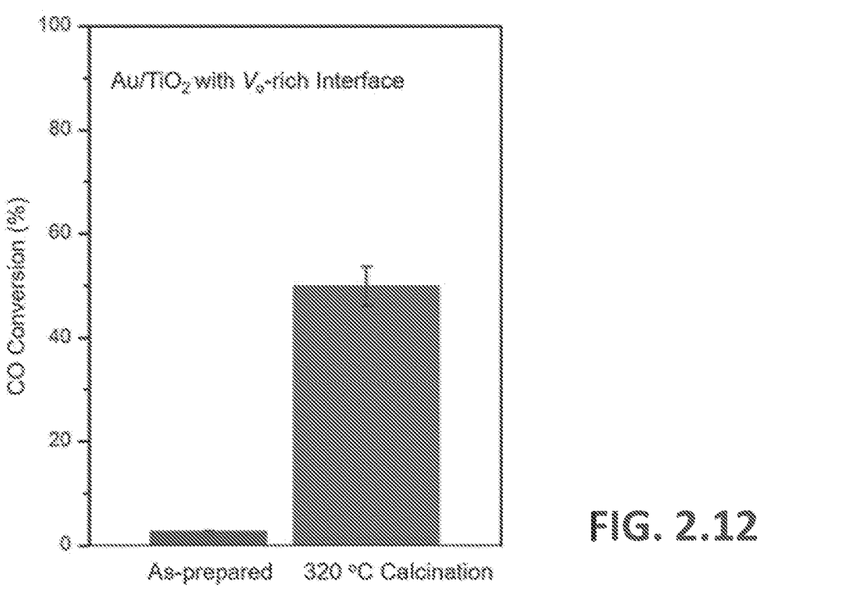

High temperature calcination has been used to reconstruct interfacial atomic structures between metal NPs and oxides.[38,39] FIG. 2.11 showed that, after treating $Au/TiO_2$ heterostructures with the $V_o$-rich interface at 320° C. for 3 hours, calcination significantly decreased the amount of interfacial $V_o$, suggesting that electrons were released from interfacial $V_o$ into perimeter $O_2$ molecules to promote $O_2$ activation for CO oxidation. Indeed, we observed a ca. 18.5 times higher activity of CO oxidation after the calcination (FIG. 2.12).

In summary, we have successfully manipulated atomic structures at the $Au/TiO_2$ interface to alter the interfacial electron distribution and promote the catalytic activity. Compared to the $V_o$-rich interface, $Au/TiO_2$ heterostructures with the defect-free interface showed significantly higher efficiency for $O_2$ activation. Spectroscopic studies revealed that the defect-free interface permitted the electron transfer from $TiO_2$ into Au NPs to activate adsorbed perimeter O2 molecules. By contrast, the $V_o$-rich interface trapped electrons at $V_o$ on $TiO_2$ and prevented electrons from interacting with perimeter $O_2$ molecules. Moreover, we found that calcination significantly decreased the amount of interfacial $V_o$ at the $V_o$-rich $Au/TiO_2$ interface and released electrons from interfacial $V_o$ to promote $O_2$ activation, further illustrating the importance of manipulating interfacial atomic structures in facilitating heterogeneous catalysis. Taken together, our results not only establish an atomic-level understanding of the interfacial-structure-dependent catalytic activity on $Au/TiO_2$ heterostructures, but also provide strategies to engineer metal/oxide interfaces for optimizing heterogeneous catalysis.

References for Example 1

(1) Haruta, M.; Tsubota, S.; Kobayashi, T.; Kageyama, H.; Genet, M. J.; Delmon, B. Low-temperature oxidation of CO over gold supported on $TiO_2$, $\alpha$-$Fe_2O_3$, and $CO_3O_4$. *J. Catal.* 1993, 144, 175-192.

(2) Schubert, M. M.; Hackenberg, S.; Van Veen, A. C.; Muhler, M.; Plzak, V.; Behm, J. J. CO oxidation over supported gold catalysts —"Inert" and 'active' support materials and their role for the oxygen supply during reaction. *J. Catal.* 2001, 197, 113-122.

(3) Chen, M.; Goodman, D. W. Catalytically active gold: From nanoparticles to ultrathin films. *Acc. Chem. Res.* 2006, 39, 739-746.

(4) Cargnello, M.; Doan-nguyen, V. V. T.; Gordon, T. R.; Diaz, R. E.; Stach, E. A.; Gorte, R. J.; Fornasiero, P.; Murray, C. B. Control of Metal Nanocrystal Size Reveals Metal-Support Interface Role for Ceria Catalysts. *Science* 2013, 341, 771-774.

(5) Min, B. K.; Friend, C. M. Heterogeneous gold-based catalysis for green chemistry: Low-temperature CO oxidation and propene oxidation. *Chem. Rev.* 2007, 107, 2709-2724.

(6) Green, I. X.; Tang, W.; Neurock, M.; Yates, J. T. Insights into catalytic oxidation at the Au/TiO$_2$ dual perimeter sites. *Acc. Chem. Res.* 2014, 47, 805-815.

(7) Chen, M.; Cai, Y; Yan, Z.; Goodman, D. W. On the origin of the unique properties of supported Au nanoparticles. *J. Am. Chem. Soc.* 2006, 128, 6341-6346.

(8) Goodman, M. S. C.; D. W. The Structure of Catalytically. *Science* 2004, 306, 252-255.

(9) Vajda, S.; White, M. G. Catalysis Applications of Size-Selected Cluster Deposition. *ACS Catal.* 2015, 5, 7152-7176.

(10) DeRita, L.; Resasco, J.; Dai, S.; Boubnov, A.; Thang, H. V.; Hoffman, A. S.; Ro, I.; Graham, G. W.; Bare, S. R.; Pacchioni, G.; Pan, X.; Christopher, P. Structural evolution of atomically dispersed Pt catalysts dictates reactivity. *Nat. Mater.* 2019, 18, 746-751.

(11) Hemmingson, S. L.; Campbell, C. T Trends in Adhesion Energies of Metal Nanoparticles on Oxide Surfaces: Understanding Support Effects in Catalysis and Nanotechnology. *ACS Nano* 2017, 11, 1196-1203.

(12) Li, D.; Chen, S.; You, R.; Liu, Y; Yang, M.; Cao, T.; Qian, K.; Zhang, Z.; Tian, J.; Huang, W. Titania-morphology-dependent dual-perimeter-sites catalysis by Au/TiO$_2$ catalysts in low-temperature CO oxidation. *J. Catal.* 2018, 368, 163-171.

(13) Li, X.; Yang, X.; Huang, Y.; Zhang, T.; Liu, B. Supported Noble-Metal Single Atoms for Heterogeneous Catalysis. *Adv Mater* 2019, 1902031.

(14) Liu, L.; Corma, A. Metal Catalysts for Heterogeneous Catalysis: From Single Atoms to Nanoclusters and Nanoparticles. *Chem. Rev* 2018, 118, 4981-5079.

(15) Polo-Garzon, F.; Fung, V.; Nguyen, L.; Tang, Y.; Tao, F.; Cheng, Y.; Daemen, L. L.; Ramirez-Cuesta, A. J.; Foo, G. S.; Zhu, M.; Wachs, I. E.; Jiang, D.; Wu, Z. Elucidation of the Reaction Mechanism for High-Temperature Water Gas Shift over an Industrial-Type Copper-Chromium-Iron Oxide Catalyst. *J. Am. Chem. Soc.* 2019, 141, 7990-7999.

(16) Zhao, N.; He, C.; Liu, J.; Gong, H.; An, T.; Xu, H.; Zhao, F.; Hu, R.; Ma, H.; Zhang, J. Dependence of catalytic properties of Al/Fe$_2$O$_3$ thermites on morphology of Fe$_2$O$_3$ particles in combustion reactions. *J. Solid State Chem.* 2014, 219, 67-73.

(17) Kumar, G.; Tibbitts, L.; Newell, J.; Panthi, B.; Mukhopadhyay, A.; Rioux, R. M.; Pursell, C. J.; Janik, M.; Chandler, B. D. Evaluating differences in the active-site electronics of supported Au nanoparticle catalysts using Hammett and DFT studies. *Nat. Chem.* 2018, 10, 268-274.

(18) Chen, A.; Yu, X.; Zhou, Y; Miao, S.; Li, Y.; Kuld, S.; Sehested, J.; Liu, J.; Aoki, T.; Hong, S.; Camellone, M. F.; Fabris, S.; Ning, J.; Jin, C.; Yang, C.; Nefedov, A.; Wöll, C.; Wang Y.; Shen, W. Structure of the catalytically active copper-ceria interfacial perimeter. *Nat. Catal.* 2019, 2, 334-341.

(19) Thompson, T. L.; Yates, J. T. Surface science studies of the photoactivation of TiO$_2$— New photochemical processes. *Chem. Rev* 2006, 106, 4428-4453.

(20) Diebold, U. The surface science of titanium dioxide. *Surf. Sci. Rep.* 2002, 48, 53-229.

(21) Tsukamoto, D.; Shiraishi, Y.; Sugano, Y.; Ichikawa, S.; Tanaka, S.; Hirai, T. Gold nanoparticles located at the interface of anatase/rutile TiO$_2$ particles as active plasmonic photocatalysts for aerobic oxidation. *J. Am. Chem. Soc.* 2012, 134, 6309-6315.

(22) Matthey, D.; Wang, J. G.; Wendt, S.; Matthiesen, J.; Schaub, R.; Logsgaard, E.; Hammer, B.; Besenbacher, F. Enhanced Bonding of Gold Nanoparticles on Oxidized TiO$_2$(110). *Science* 2007, 315, 1692.

(23) Wang, Y.; Widmann, D.; Behm, R. J. Influence of TiO$_2$ Bulk Defects on CO Adsorption and CO Oxidation on Au/TiO$_2$: Electronic Metal-Support Interactions (EMSIs) in Supported Au Catalysts. *ACS Catal.* 2017, 7, 2339-2345.

(24) Qian, K.; Sweeny, B. C.; Johnston-Peck, A. C.; Niu, W.; Graham, J. O.; Duchene, J. S.; Qiu, J.; Wang, Y.; Engelhard, M. H.; Su, D.; Stach, E. A.; Wei D. W. Surface plasmon-driven water reduction: Gold nanoparticle size matters. *J. Am. Chem. Soc.* 2014, 136, 9842-9845.

(25) Tanaka, A.; Ogino, A.; Iwaki, M.; Hashimoto, K.; Ohnuma, A.; Amano, F.; Ohtani, B.; Kominam, H. Gold-Titanium(IV) Oxide Plasmonic Photocatalysts Prepared by a Colloid-Photodeposition Method: Correlation Between Physical Properties and Photocatalytic Activities. *Langmuir* 2012, 28, 13105-13111.

(26) Duchene, J. S.; Sweeny, B. C.; Johnston-Peck, A. C.; Su, D.; Stach, E. A.; Wei, W. D. Prolonged hot electron dynamics in plasmonic-metal/semiconductor heterostructures with implications for solar photocatalysis. *Angew. Chemie —Int. Ed.* 2014, 53, 7887-7891.

(27) He, S.; Huang, J.; Goodsell, J. L.; Angerhofer, A.; Wei, W. D. Plasmonic Nickel-TiO$_2$ Heterostructures for Visible-Light-Driven Photochemical Reactions. *Angew. Chemie/nt. Ed.* 2019, 1-5.

(28) Priebe, J. B.; Radnik, J.; Lennox, A. J. J.; Pohl, M. M.; Karnahl, M.; Hollmann, D.; Grabow, K.; Bentrup, U.; Junge, H.; Beller, M.; Bruckner, A. Solar Hydrogen Production by PlasmonicAu-TiO$_2$ Catalysts: Impact of Synthesis Protocol and TiO$_2$ Phase on Charge Transfer Efficiency and H$_2$ Evolution Rates. *ACS Catal.* 2015, 5, 2137-2148.

(29) Priebe, J. B.; Karnahl, M.; Junge, H.; Beller, M.; Hollmann, D.; Bruckner, A. Water reduction with visible light: Synergy between optical transitions and electron transfer in Au—TiO$_2$ catalysts visualized by in situ EPR spectroscopy. *Angew. Chemie —Int. Ed.* 2013, 52, 11420-11424.

(30) Chiesa, M.; Paganini, M. C.; Livraghi, S.; Giamello, E. Charge trapping in TiO$_2$ polymorphs as seen by Electron Paramagnetic Resonance spectroscopy. *Phys. Chem. Chem. Phys.* 2013, 15, 9435-9447.

(31) Minato, T; Susaki, T.; Shiraki, S.; Kato, H. S.; Kawai, M.; Aika, K. Investigation of the electronic interaction between TiO$_2$ (110) surfaces and Au clusters by PES and STM. *Surf. Sci.* 2004, 566-568, 1012-1017.

(32) Siemer, N.; LOken, A.; Zalibera, M.; Frenzel, J.; Munoz-Santiburcio, D.; Savitsky, A.; Lubitz, W.; Muhler, M.; Marx, D.; Strunk, J. Atomic-Scale Explanation of O$_2$ Activation at the Au—TiO$_2$ Interface. *J. Am. Chem. Soc.* 2018, 140, 18082-18092.

(33) McEntee, M.; Stevanovic, A.; Tang, W.; Neurock, M.; Yates, J. T. Electric field changes on Au nanoparticles on semiconductor supports—The molecular voltmeter and other methods to observe adsorbate-induced charge-transfer effects in Au/TiO$_2$ Nanocatalysts. *J. Am. Chem. Soc.* 2015, 137, 1972-1982.

(34) Chen, M. S.; Goodman, D. W. Catalytically active Au: from nano-particles to ultra-thin films. *Acc. Chem. Res.* 2006, 39, 739.

(35) Yoon, B.; Häkkinen, H.; Landman, U.; Wörz, A. S.; Antonietti, J. M.; Abbet, S.; Judai, K.; Heiz, U. Charging Effects on Bonding and Catalyzed Oxidation of CO on Au$_8$ Clusters on MgO. *Science* 2005, 307, 403-407.

(36) Green, I. X.; Tang, W.; Neurock, M.; Yates, J. T. Spectroscopic observation of dual catalytic sites during oxidation of CO on a Au/TiO$_2$ catalyst. *Science* 2011, 333, 736-739.

(37) Green, I. X.; Tang, W.; McEntee, M.; Neurock, M.; Yates, J. T. Inhibition at perimeter sites of Au/TiO$_2$ oxidation catalyst by reactant oxygen. *J. Am. Chem. Soc.* 2012, 134, 12717-12723.

(38) Rao, R. G.; Blume, R.; Hansen, T. W.; Fuentes, E.; Dreyer, K.; Moldovan, S.; Ersen, 0.; Hibbitts, D. D.; Chabal, Y. J.; Schlögl, R.; Tessonnier, J. P. Interfacial charge distributions in carbon-supported palladium catalysts. *Nat. Commun.* 2017, 8.

(39) Zhang, S.; Plessow, P. N.; Willis, J. J.; Dai, S.; Xu, M.; Graham, G. W.; Cargnello, M.; Abild-Pedersen, F.; Pan, X. Dynamical observation and detailed description of catalysts under strong metal-support interaction. *Nano Lett.* 2016, 16, 4528-4534.

Supplemental Information for Example 1

Chemicals. Commercially available P25 (Degussa) and trisodium citrate (Na$_3$C$_6$H$_5$O$_7$) were purchased from Fisher Scientific (Hampton, NH). Chloroauric acid trihydrate (HAuCl$_4$·3H$_2$O) (≥99.9% trace metals basis), sodium borohydride (NaBH$_4$), silica (SiO$_2$) supports (100-200 mesh silica gel), and ammonium hydroxide (NH$_4$OH) (ACS reagent, 28.0-30.0% NH$_3$ basis) were purchased from Sigma-Aldrich (St. Louis, MO). All chemicals were used as received without further purification. All glassware was cleaned with aqua regia solution, followed by copious rinsing with Nanopure™ H$_2$O (Barnstead, 18.2 MΩ cm) prior to use. (CAUTION! Aqua regia is highly corrosive and toxic. Handle with care and use appropriate personal protection equipment.)

Figure 213:
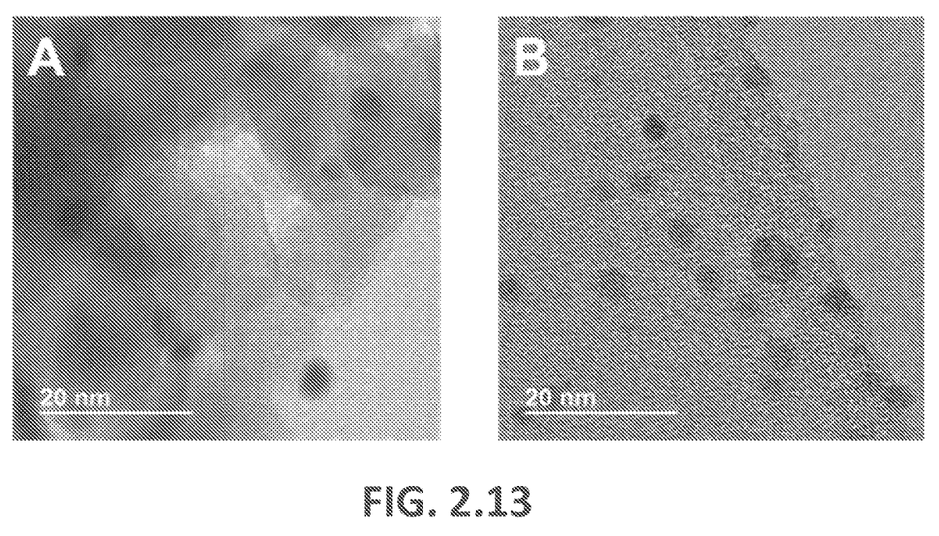

Synthesis of Au/TiO$_2$ Heterostructures with the Defect-Free Interface. Au/TiO$_2$ heterostructures with the defect-free interface were prepared using the deposition-precipitation method to grow 1 wt % and 5 wt % ca. 4-5 nm Au nanoparticles (NPs) onto commercially available P25 supports (FIG. 2.13A).[1] 1.1 g of P25 was dispersed into 100 mL of Nanopure™ H$_2$O under continuous sonication in a 250 mL round-bottom flask. 2.2 mL and 11 mL of a 25 mM HAuCl$_4$ solution was then added to achieve the desired 1 wt % and 5 wt % Au loading, respectively. The mixture was placed in an oil bath and stirred at 60° C. for 30 min. 10% NH$_4$OH was added dropwise to adjust its pH to 9-10, and the mixture was further stirred in the oil bath at 60° C. for another 4 h. The solid was collected via centrifugation at 10,000 RPM for 10 min, and then washed with Nanopure™ H$_2$O. The washing process was repeated three times, followed by drying the sample at 60° C. overnight in the oven to achieve a powder. The powder sample was finally calcined at 210° C. for 3 h in the oven to create Au/TiO$_2$ heterostructures. Note: the deposition-precipitation method was also utilized to deposit 1 wt % Au NPs onto SiO$_2$ supports to construct Au/SiO$_2$ heterostructures. Meanwhile, P25 employed in EPR measurements was pretreated by the deposition-precipitation method without adding HAuCl$_4$ solution. This pretreatment aimed to demonstrate that the observed differences in EPR spectra originated from the Au deposition.

Synthesis of Au/TiO$_2$ Heterostructures with the Oxygen Vacancy (V$_o$)-rich Interface. Au/TiO$_2$ heterostructures with the V$_o$-rich interface were prepared via several steps that were based on the previous report with modifications (FIG. 2.13B).[2] First, Au NPs were fabricated with a ca. 4-5 nm size via NaBH$_4$ reduction of HAuCl$_4$ in the presence of sodium citrate.[3] In this process, 1 mL of 10 mM HAuCl$_4$ and 1 mL of 10 mM sodium citrate were added to 37 mL of Nanopure™ H$_2$O in a 100 mL beaker. A 1 mL aliquot of a 100 mM ice-cold NaBH$_4$ solution was freshly prepared and then immediately added to the previously prepared solution under the vigorous magnetic stirring. The Au NP solution reacted overnight prior to use. 4.06 mL and 8.12 mL of prepared Au NP solutions were added to the mixture of 40 mg of P25 and 80 mL of Nanopure™ H$_2$O to achieve the desired 0.5 wt % and 1 wt % Au loading, respectively. The mixture was stirred at room temperature for 24 h. The solid was collected via centrifugation at 10,000 RPM for 15 min and washed with Nanopure™ H$_2$O. This washing process was repeated three times before drying the sample at 60° C. overnight in the oven to collect the powder. The powder sample was finally calcined at 210° C. for 3 h in the oven to create Au/TiO$_2$ heterostructures. To achieve the interfacial reconstruction, the powder sample was further calcined at 320° C. for 3 h in the air using a tube furnace.

Electron Paramagnetic Resonance (EPR) Spectroscopy Data Collection and Analysis.

EPR experiments were performed on a Bruker ELEXSYS-II E500 CW X-band spectrometer within a super high-Q cavity (ER 4123SHQE), equipped with an ESR900 Oxford Instruments helium flow cryostat for low temperature (T=90 K) experiments. For each experiment, 40±2 mg of a sample was loaded into a quartz EPR tube, capped, and placed within the microwave cavity. All spectra were collected using the following instrument parameters: 100 kHz modulation frequency, 3 G modulation amplitude, 40 ms conversion time, 15 mW microwave power, and 60 dB receiver gain. A total of 20 scans were used to acquire a signal average for each sample. The background signal measured from the pure quartz EPR tube was removed from the EPR spectra and g values used in the EPR simulation were summarized in Supplementary Table S1. Simulated EPR spectra were generated using the EasySpin toolbox in MATLAB.[4] Note: EPR spectra of two Au/TiO$_2$ heterostructures in FIGS. 1.2B and 1.2C were collected when the Au loading amount was 1 wt %.

Diffuse Reflectance Infrared Fourier Transform Spectroscopy (DRIFTS) Data Collection and Analysis. DRIFTS measurements were performed on a Nicolet iS50 FTIR spectrometer equipped with a DRIFTS reaction cell (Harrick Scientific Products, Inc.) at room temperature. Prior to each measurement, 30 mg of catalysts (Au/TiO$_2$ heterostructures with 1 wt % Au loading) were loaded onto the sample stage of reaction cell, treated at 210° C. under He condition for 1 hour and then cooled to room temperature. The DRIFTS spectrum of freshly prepared catalyst purged with He was taken as the background spectrum. A MCT/A detector operated in series mode with 128 scans and a resolution of 2 cm$^{-1}$ was employed. For measurements of the vibrational mode of adsorbed carbon monoxide molecules v(CO) on Au/TiO$_2$ heterostructures, the spectra were collected after 1% CO/He was purged into the reaction cell at a flow rate of 20 mL min$^{-1}$ for 5 min. It should be noted that the spectrum collected at 5 min was similar to that obtained after 15 min, indicating that the CO adsorption and desorption on Au/TiO$_2$ heterostructures have reached the steady-state condition at a flow rate of 20 mL min$^{-1}$ for 5 min. For in operando DRIFTS measurements of v(CO) on Au/TiO$_2$ heterostructures during O$_2$ activation, the spectra were collected after 1% CO/air was purged into the reaction cell at a flow rate of 20 mL min$^{-1}$ for 25 min. The spectra were fitted by the XPSPEAK 4.1 software.

Room Temperature CO Oxidation Reactions. The catalytic activity was evaluated with a homemade fixed-bed flow reactor. 25 mg of catalysts were calcined at 210° C. in the oven for 1 h and then loaded into the reactor under the continuous gas flow. The reaction gas was a mixture of 1% CO/air at a flow rate of 20 mL min$^{-1}$. The composition of the effluent gas was analyzed every 30 min with Shimadzu gas chromatograph (GC 2014 online), using a carboxen 1000 column (Supelco, T=110° C.) and incorporating He as the carrier gas at 20 mL min$^{-1}$. The steady-state conversion of CO was calculated from the difference in CO concentrations between the inlet and outlet gases. Measurements were repeated three times to obtain the average value and the standard deviation. To achieve the activation barrier of CO oxidation reaction, the specific reaction rate of CO oxidation was measured under different reaction temperatures according to the following equation:

$$r(\mu mol\ g^{-1}\ s^{-1}) = \frac{\Delta p(\%) f\left(\frac{mL}{min}\right) c\left(\frac{\mu mol}{mL}\right)}{\left(60\frac{s}{min}\right) m(g)}$$

where $\Delta p(\%)$ represents the conversion percentage of CO to CO$_2$, f (mL/min) is the flow rate of feeding 1% CO/air, c(μmol/mL) is the initial concentration of CO before CO oxidation reaction, and m(g) is the amount of catalysts used in CO oxidation experiments.

Other Characterizations. X-ray photoelectron spectroscopy (XPS) experiments were conducted at the Major Analytical Instrumentation Center (MAIC) using a PHI 5000 VersaProbe II instrument. A focused monochromatic Al Kα X-ray source (1486.6 eV) and a spherical section analyzer were utilized. A 50 W X-ray beam was focused to a 200 μm diameter spot size incident normal to the sample with the photoelectron detector at 45° off-normal. The binding energy of adventitious carbon at 284.8 eV was used as a reference to correct for any specimen charging effects for all XPS spectra. The resolution of XPS spectra was 0.1 eV. Note: XPS spectra of two Au/TiO$_2$ heterostructures in FIG. 1.2A were collected when the Au loading amount was 1 wt %. Transmission electron microscopy (TEM) and high-resolution TEM (HRTEM) were conducted on a JEOL 2010F HRTEM operated at 200 kV, located at MAIC at the University of Florida (UF).

Numerical Simulations. Theoretical calculations were carried out using density functional theory (DFT) calculations via Quantum Espresso (v.6.2).[5,6] The generalized gradient approximation with PBE functional was used to describe the exchange-correlation energy.[7] Valence electrons were described using Kohn-Sham single-electron wave functions by a plane-wave basis set with an energy cut-off of 400 eV. The DFT+U method with $U_{eff}$ at 4.0 eV was applied to 3d orbitals of Ti to correct on-site Coulomb interactions.[8,9] Au/TiO$_2$ heterostructures were constructed by depositing a periodic three-layers Au rod onto a periodic three layers of rutile TiO$_2$ (110) slab along the TiO$_2$ [1$\bar{1}$0] direction. The interfacial layer has the structure of Au (111) surface. For Au/TiO$_2$ heterostructures with the defect-free interface, one of the interfacial oxygen atoms on TiO$_2$ was substituted by a Au atom to represent the diffusion of Au atoms into surface V$_o$ on TiO$_2$, while this oxygen atom was removed without adding a Au atom for the V$_o$-rich Au/TiO$_2$ interface. An O$_2$ molecule was added at the perimeter of Au/TiO$_2$ heterostructures. Structure optimizations were obtained until the force converged to less than 0.01 eV Å$^{-1}$ at each atomic position. Relaxed structures were visualized by VESTA.[10] A Bader analysis was employed to determine the local charge of atoms in the system.[11,12]

Previous studies have shown that using the adventitious carbon (284.8 eV) as a reference, the binding energy of the C 1s for COO—Au (i.e., the chemical bond between adsorbed citrate ions and Au) was located at 287.6 eV.[14] However, as shown in our XPS spectrum, we did not observe any feature at the binding energy of 287.6 eV for Au/TiO$_2$ heterostructures with the V$_o$-rich interface, confirming that no citrate ions remained on Au surfaces for Au/TiO$_2$ heterostructures prepared by the CD method.

Compared to the reported v(CO) at 2117 cm$^{-1}$ on Au/SiO$_2$ NPs,[17] both v(CO) for Au/TiO$_2$ heterostructures with the defect-free interface at 2103 cm$^{-1}$ and v(CO) for Au/TiO$_2$ heterostructures with the V$_o$-rich interface at 2107 cm$^{-1}$ revealed that supported Au NPs on TiO$_2$ were negatively charged. In addition, a stronger red-shift of v(CO) on the defect-free interface as compared to that on the V$_o$-rich interface suggested that Au NPs on the defect-free interface were more electron-rich than those on the V$_o$-rich interface. These consistent results between DRIFTS and XPS measurements (FIG. 1.2A) demonstrated that CO was suitable to function as a molecular probe for detecting subtle variations in the surface electron density of Au NPs during O$_2$ activation in operando.

It is known that the full-width half maximum (FWHM) of vibrational signature in DRIFTS is determined by the lifetime of vibrationally excited sates (Equation (1)).[18] When CO molecules chemisorb on the metal surface (e.g., Cu (110)), a commonly accepted damping mechanism that governs the lifetime of CO vibrationally excited state is the charge oscillation between adsorbed CO molecules and metal.[19,20] In detail, upon chemisorption of CO molecules onto the metal surface, electrons originated from metal are back-donated into 2π* orbital of adsorbed CO molecules, increasing the charge oscillation between molecular orbitals of adsorbed CO and metal. Since the charge oscillation can not occur adiabatically, energy is eventually lost through the excitation of electron-hole pairs in the metal, leading to the vibrational damping of CO molecules. Equation (2) is accordingly derived to explain the relationship between the lifetime of vibrational excitation of CO molecules and the magnitude of charge oscillations between adsorbed CO molecules and metal.[19-21] Since more electrons were back-donated from Au NPs into 2π* orbitals of adsorbed CO molecules on Au/TiO$_2$ heterostructures with the defect-free interface, the value of charge oscillation (δn) between molecular orbitals of adsorbed CO and Au NPs was larger than that on Au/TiO$_2$ heterostructures with the V$_o$-rich interface. As a result, according to Equation (1) and (2), a broader FWHM of CO vibrational signature was observed on the defect-free interface as compared to that of CO vibrational signature on the V$_o$-rich interface.

$$\delta v_n = (2\pi\tau_i)^{-1} \text{ or } \delta\omega_n = 1/\tau_i \qquad (1)$$

where $\delta v_n$ and $\delta \omega_n$ represent FWHM in terms of angular frequency, and $T_i$ is the lifetime of vibrational excitation in molecules.

$$1/T_i \propto 2\pi\Omega(\delta n)^2 \quad (2)$$

where $\Omega$ is the vibration frequency and $\delta n$ is the magnitude of charge oscillation between molecular orbitals of adsorbed CO and metal.

TABLE S1

Summary of g values used for simulation of X-band EPR spectra at 90K.

| Signal Assignment | Average $g_x$ | Average $g_y$ | Average $g_z$ |
|---|---|---|---|
| $e^-(V_o)$ | 2.003 | 2.003 | 2.003 |
| $Ti^{3+}$(Rutile) | 1.978 | 1.978 | 1.962 |
| $Ti^{3+}$(Anatase) | 1.991 | 1.991 | 1.950 |

References for Supplementary Information (1) Qian, K.; Sweeny, B. C.; Johnston-Peck, A. C.; Niu, W.; Graham, J. O.; Duchene, J. S.; Qiu, J.; Wang, Y.; Engelhard, M. H.; Su, D.; Stach, E. A.; Wei D. W. Surface plasmon-driven water reduction: Gold nanoparticle size matters. *J. Am. Chem. Soc.* 2014, 136, 9842-9845.

(2) Tanaka, A.; Ogino, A.; Iwaki, M.; Hashimoto, K.; Ohnuma, A.; Amano, F.; Ohtani, B.; Kominami, H. Gold-Titanium(IV) Oxide Plasmonic Photocatalysts Prepared by a Colloid-Photodeposition Method: Correlation Between Physical Properties and Photocatalytic Activities. *Langmuir* 2012, 28, 13105-13111.

(3) DuChene, J. S.; Niu, W.; Abendroth, J. M.; Sun, Q.; Zhao, W.; Huo, F.; Wei, D. W. Halide anions as shape-directing agents for obtaining high-quality anisotropic gold nanostructures. *Chem. Mater.* 2013, 25, 1392-1399.

(4) Stoll, S.; Schweiger, A. EasySpin, a comprehensive software package for spectral simulation and analysis in EPR. *J. Magn. Reson.* 2006, 178, 42-55.

(5) Giannozzi, P.; Andreussi, 0.; Brumme, T.; Bunau, 0.; Nardelli, M. B.; Calandra, M.; Car, R.; Cavazzoni, C.; Ceresoli, D.; Cococcioni, M.; Colonna, N.; Carnimeo, I.; Corso, A. D.; Gironcoli, S. D.; Delugas, P.; DiStasio Jr, R. A.; Ferretti, A.; Floris, A.; Fratesi, G.; Fugallo, G.; Gebauer, R.; Gerstmann, U.; Giustino, F.; Gorni, T.; Jia, J.; Kawamura, M.; Ko, H. Y.; Kokalj, A.; Küçükbenli, E.; Lazzeri, M.; Marsili, M.; Marzari, N.; Mauri, F.; Nguyen, N. L.; Nguyen, H. V.; Otero-de-la-Roza, A.; Paulatto, L.; Poncé, S.; Rocca, D.; Sabatini, R.; Santra, B.; Schlipf, M.; Seitsonen, A. P.; Smogunov, A.; Timrov, I.; Thonhauser, T.; Umari, P.; Vast, N.; Wu, X.; Baroni, S. Advanced capabilities for materials modelling with Quantum ESPRESSO. *J. Phys. Condens. Matter* 2017, 29, 465901.

(6) Giannozzi, P.; Baroni, S.; Bonini, N.; Calandra, M.; Car, R.; Cavazzoni, C.; Ceresoli, D.; Chiarotti, G. L.; Cococcioni, M.; Dabo, I.; Corso, A. D.; Gironcoli, S. D.; Fabris, S.; Fratesi, G.; Gebauer, R.; Gerstmann, U.; Gougoussis, C.; Kokalj, A.; Lazzeri, M.; Martin-Samos, L.; Marzari, N.; Mauri, F.; Mazzarello, R.; Paolini, S.; Pasquarello, A.; Paulatto, L.; Sbraccia, C.; Scandolo, S.; Sclauzero, G.; Seitsonen, A. P.; Smogunov, A.; Umari, P.; Wentzcovitch, R. W. QUANTUM ESPRESSO: A modular and open-source software project for quantum simulations of materials. *J. Phys. Condens. Matter* 2009, 21, 395502.

(7) Perdew, J. P.; Burke, K.; Ernzerhof, M. Generalized gradient approximation made simple. *Phys. Rev. Lett.* 1996, 77, 3865.

(8) Finazzi, E.; Di Valentin, C.; Pacchioni, G.; Selloni, A. Excess electron states in reduced bulk anatase $TiO_2$: Comparison of standard GGA, GGA+U, and hybrid DFT calculations. *J. Chem. Phys.* 2008, 129.

(9) Morgan, B. J.; Watson, G. W. A DFT+U description of oxygen vacancies at the $TiO_2$ rutile (1 1 0) surface. *Surf. Sci.* 2007, 601, 5034-5041.

(10) Momma, K.; Izumi, F. VESTA 3 for three-dimensional visualization of crystal, volumetric and morphology data. *J. Appl. Crystallogr.* 2011, 44, 1272-1276.

(11) Tang, W.; Sanville, E.; Henkelman, G. A grid-based Bader analysis algorithm without lattice bias. *J. Phys. Condens. Matter* 2009, 21.

(12) Henkelman, G.; Arnaldsson, A.; Jónsson, H. A fast and robust algorithm for Bader decomposition of charge density. *Comput. Mater. Sci.* 2006, 36, 354-360.

(13) Priebe, J. B.; Radnik, J.; Lennox, A. J. J.; Pohl, M. M.; Karnahl, M.; Hollmann, D.; Grabow, K.; Bentrup, U.; Junge, H.; Beller, M.; Bruckner, A. Solar Hydrogen Production by Plasmonic $Au-TiO_2$ Catalysts: Impact of Synthesis Protocol and $TiO_2$ Phase on Charge Transfer Efficiency and $H_2$ Evolution Rates. *ACS Catal.* 2015, 5, 2137-2148.

(14) Park, J. W.; Shumaker-Parry, J. S. Structural study of citrate layers on gold nanoparticles: role of intermolecular interactions in stabilizing nanoparticles. *J. Am. Chem. Soc.* 2014, 136, 1907-1921.

(15) Priebe, J. B.; Karnahl, M.; Junge, H.; Beller, M.; Hollmann, D.; Bruckner, A. Water reduction with visible light: Synergy between optical transitions and electron transfer in $Au-TiO_2$ catalysts visualized by in situ EPR spectroscopy. *Angew. Chemie —Int. Ed.* 2013, 52, 11420-11424.

(16) Chiesa, M.; Paganini, M. C.; Livraghi, S.; Giamello, E. Charge trapping in $TiO_2$ polymorphs as seen by Electron Paramagnetic Resonance spectroscopy. *Phys. Chem. Chem. Phys.* 2013, 15, 9435-9447.

(17) Qian, K.; Luo, L.; Bao, H.; Hua, Q.; Jiang, Z.; Huang, W. Catalytically active structures of $SiO_2$-supported Au nanoparticles in low-temperature CO oxidation. *Catal. Sci. Technol.* 2013, 3, 679-687.

(18) Demtröder W. Laser spectroscopy 1: basic principles. Ed. 4 74-111 (Springer, 2014).

(19) Ryberg, R. Carbon monoxide adsorbed on Cu (100) Studied by infrared spectroscopy. *Surf. Sci.* 1982, 114, 627-641.

(20) Persson, B. N. J.; Ryberg, R. Vibrational interaction between molecules adsorbed on a metal surface: The dipole-dipole interaction. *Phys. Rev. B* 1981, 24, 6954-6970.

(21) Persson, B. N. J.; Persson, M. Vibrational lifetime for CO adsorbed on Cu (100). *Solid State Commun.* 1980, 36, 175-179.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A method comprising:
providing a $M/TiO_2$ composite having an oxygen vacancy (Vo)-rich $M/TiO_2$ interface;
calcinating the $M/TiO_2$ composite at about 300 to 350° C. for a time frame to form a $M/TiO_2$ composite having a defect-free $M/TiO_2$ interface, wherein the $M/TiO_2$ composite is a $Cu/TiO_2$ composite.

2. The method of claim 1, wherein the time frame is about 1 to 3 hours.

3. A method comprising:
heating a mixture of $TiO_2$ with a metal nanoparticle precursor material to form a solid material comprising a $M/TiO_2$ composite having an oxygen vacancy (Vo)-rich $M/TiO_2$ interface; and
calcinating the solid material comprising the $M/TiO_2$ composite at about 300 to 350° C. for a time frame to form a $M/TiO_2$ composite having a defect-free $M/TiO_2$ interface.

4. The method of claim 3, wherein heating includes heating the mixture at about 300 to 350 K for about 15 to 45 minutes at a pH of about 9-10.

5. The method of claim 3, wherein the time frame is about 1 to 3 hours.

6. The method of claim 3, wherein the M is Au, Ag, Al, Cu, Pt, Ni, or Pd.

7. The method of claim 3, wherein the $M/TiO_2$ composite is a $Au/TiO_2$ composite.

8. The method of claim 3, wherein the $M/TiO_2$ composite is a $Cu/TiO_2$ composite.

* * * * *